(12) United States Patent
Wei et al.

(10) Patent No.: US 12,302,301 B2
(45) Date of Patent: *May 13, 2025

(54) TECHNIQUES AND APPARATUSES FOR CARRIER MANAGEMENT

(71) Applicant: QUALCOMM Incorporated, San Diego, CA (US)

(72) Inventors: Chao Wei, Beijing (CN); Alberto Rico Alvarino, San Diego, CA (US); Le Liu, San Jose, CA (US); Wanshi Chen, San Diego, CA (US); Xiao Feng Wang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/903,695

(22) Filed: Sep. 6, 2022

(65) Prior Publication Data

US 2022/0417931 A1    Dec. 29, 2022

Related U.S. Application Data

(63) Continuation of application No. 16/756,729, filed as application No. PCT/CN2018/103208 on Aug. 30, 2018, now Pat. No. 11,477,784.

(30) Foreign Application Priority Data

Nov. 16, 2017   (WO) ............... PCT/CN2017/111308

(51) Int. Cl.
*H04L 12/28*   (2006.01)
*H04L 5/00*    (2006.01)
(Continued)

(52) U.S. Cl.
CPC ....... *H04W 72/0453* (2013.01); *H04L 5/0098* (2013.01); *H04W 74/0833* (2013.01)

(58) Field of Classification Search
CPC ......... H04W 72/0453; H04W 72/0446; H04W 48/12; H04W 74/002; H04L 5/0098; H04L 5/001
(Continued)

(56) References Cited

U.S. PATENT DOCUMENTS 8,705,461 B2 *   4/2014  Bala .................... H04L 5/0092
                                                      370/336
9,119,132 B2     8/2015  Luo et al.
(Continued)

FOREIGN PATENT DOCUMENTS

CN        1404668 A       3/2003
CN       102035786 A      4/2011
(Continued)

OTHER PUBLICATIONS

3GPP TS 36.211: "3rd Generation Partnership Project; Technical Specification Group Radio Access Network; Evolved Universal Terrestrial Radio Access (E-UTRA); Physical Channels and Modulation (Release 14)", V14.1.0 (Dec. 2016), Jan. 2, 2017, 10.2.3, pp. 75-88, 97-101, 117-119, 150-168, URL: http://www.3gpp.org/ftp/Specs/archive/36_series/36.211/36211-e10.zip, pp. 1-175.
(Continued)

*Primary Examiner* — John Pezzlo
(74) *Attorney, Agent, or Firm* — Harrity & Harrity, LLP

(57) ABSTRACT

A method, base station (BS), user equipment (UE), apparatus, and computer program product for wireless communication are provided. A BS and a UE may communicate using a narrowband Internet of Things (NB-IoT) communication system. However, a frequency, time, and/or power associated with transmission of a SIB1-NB on a non-anchor carrier
(Continued)

may not be configured for NB-IoT. In some aspects, the BS may determine parameters, such as a time domain location parameter, a frequency domain location parameter, a quantity of repetitions, a power boosting parameter, and/or the like for a transmission in NB-IoT. In some aspects, a UE may determine to transmit a connection request message on a different carrier than a random access channel message.

20 Claims, 15 Drawing Sheets

(51) Int. Cl.
  *H04W 72/0453* (2023.01)
  *H04J 1/16* (2006.01)
  *H04W 74/0833* (2024.01)
(58) Field of Classification Search
  USPC .............................. 370/252, 329, 430, 442
  See application file for complete search history.

(56) References Cited

U.S. PATENT DOCUMENTS

| | | | |
|---|---|---|---|
| 9,560,635 B2 | 1/2017 | Wei et al. | |
| 9,713,026 B2 | 7/2017 | Gaal et al. | |
| 10,104,651 B2 | 10/2018 | Chen et al. | |
| 10,165,423 B2 | 12/2018 | Rico Alvarino et al. | |
| 10,397,889 B2* | 8/2019 | Shin | H04W 72/23 |
| 10,404,360 B2 | 9/2019 | Sridharan et al. | |
| 10,420,087 B2* | 9/2019 | Shin | H04W 56/0015 |
| 10,420,102 B2 | 9/2019 | Somichetty et al. | |
| 10,469,158 B2 | 11/2019 | Sridharan et al. | |
| 10,469,159 B2 | 11/2019 | Sridharan et al. | |
| 10,498,435 B2 | 12/2019 | Sridharan et al. | |
| 10,524,258 B2 | 12/2019 | Somichetty et al. | |
| 10,542,538 B2 | 1/2020 | Somichetty et al. | |
| 10,932,260 B2 | 2/2021 | Somichetty et al. | |
| 10,939,432 B2 | 3/2021 | Somichetty et al. | |
| 10,939,475 B2* | 3/2021 | Rathonyi | H04J 1/065 |
| 10,945,265 B2 | 3/2021 | Somichetty et al. | |
| 10,958,337 B2 | 3/2021 | Sridharan et al. | |
| 11,050,483 B2 | 6/2021 | Sridharan et al. | |
| 11,134,477 B2* | 9/2021 | Terry | H04B 7/0632 |
| 11,523,427 B2* | 12/2022 | Lee | H04W 16/28 |
| 2009/0093257 A1 | 4/2009 | Rinne et al. | |
| 2011/0310856 A1 | 12/2011 | Hariharan et al. | |
| 2012/0100847 A1 | 4/2012 | Rahman | |
| 2013/0083749 A1 | 4/2013 | Xu et al. | |
| 2013/0250882 A1 | 9/2013 | Dinan | |
| 2013/0272215 A1 | 10/2013 | Khoryaev et al. | |
| 2013/0315159 A1 | 11/2013 | Xia et al. | |
| 2014/0029568 A1 | 1/2014 | Wang et al. | |
| 2014/0119332 A1 | 5/2014 | Kim et al. | |
| 2014/0204961 A1 | 7/2014 | Hooli et al. | |
| 2014/0307685 A1 | 10/2014 | Takano et al. | |
| 2014/0328230 A1 | 11/2014 | Park et al. | |
| 2015/0078220 A1 | 3/2015 | Hu et al. | |
| 2015/0124663 A1 | 5/2015 | Chen et al. | |
| 2015/0327324 A1 | 11/2015 | Wei et al. | |
| 2016/0127952 A1 | 5/2016 | You et al. | |
| 2016/0198450 A1 | 7/2016 | Wei et al. | |
| 2016/0315752 A1 | 10/2016 | Chen et al. | |
| 2016/0345118 A1 | 11/2016 | Oh | |
| 2016/0366007 A1 | 12/2016 | Hwang et al. | |
| 2017/0012755 A1 | 1/2017 | Wang et al. | |
| 2017/0041122 A1 | 2/2017 | Li et al. | |
| 2017/0070968 A1 | 3/2017 | Kim et al. | |
| 2017/0163396 A1 | 6/2017 | Blankenship | |
| 2017/0180086 A1 | 6/2017 | Xiong et al. | |
| 2017/0187563 A1 | 6/2017 | Shin et al. | |
| 2017/0195102 A1 | 7/2017 | Xiong et al. | |
| 2017/0202025 A1 | 7/2017 | Ouchi et al. | |
| 2017/0251443 A1 | 8/2017 | Shin et al. | |
| 2017/0273059 A1 | 9/2017 | You et al. | |
| 2017/0279472 A1 | 9/2017 | Wong et al. | |
| 2017/0311276 A1 | 10/2017 | Tsai et al. | |
| 2017/0373900 A1 | 12/2017 | Adhikary et al. | |
| 2018/0007667 A1 | 1/2018 | You et al. | |
| 2018/0014284 A1 | 1/2018 | Yi et al. | |
| 2018/0049047 A1 | 2/2018 | Lin et al. | |
| 2018/0049151 A1 | 2/2018 | Yoon et al. | |
| 2018/0062699 A1 | 3/2018 | Horiuchi et al. | |
| 2018/0069593 A1 | 3/2018 | Yi | |
| 2018/0077703 A1 | 3/2018 | Sun et al. | |
| 2018/0124789 A1 | 5/2018 | Yerramalli et al. | |
| 2018/0176893 A1 | 6/2018 | Zhang et al. | |
| 2018/0241495 A1 | 8/2018 | Xue et al. | |
| 2018/0248671 A1 | 8/2018 | Bhattad et al. | |
| 2018/0287846 A1 | 10/2018 | Kim et al. | |
| 2018/0316464 A1 | 11/2018 | Stern-Berkowitz et al. | |
| 2018/0317244 A1 | 11/2018 | Um et al. | |
| 2019/0013984 A1 | 1/2019 | Liang et al. | |
| 2019/0069277 A1 | 2/2019 | Awad et al. | |
| 2019/0124663 A1 | 4/2019 | Liu et al. | |
| 2019/0150164 A1 | 5/2019 | Nam et al. | |
| 2019/0182021 A1 | 6/2019 | Shokri Razaghi et al. | |
| 2019/0215872 A1 | 7/2019 | Park et al. | |
| 2019/0253231 A1* | 8/2019 | Park | H04L 5/1469 |
| 2019/0349138 A1 | 11/2019 | Hosseini et al. | |
| 2020/0059390 A1* | 2/2020 | Zhang | H04L 5/0092 |
| 2020/0112955 A1 | 4/2020 | Somichetty et al. | |
| 2020/0396722 A1* | 12/2020 | Han | H04L 1/18 |
| 2021/0099944 A1 | 4/2021 | Hoglund et al. | |
| 2021/0105821 A1 | 4/2021 | Niu et al. | |
| 2021/0111824 A1* | 4/2021 | Park | H04J 11/0076 |
| 2021/0112591 A1 | 4/2021 | Lee et al. | |
| 2021/0144641 A1* | 5/2021 | Sun | H04W 84/04 |
| 2021/0400667 A1 | 12/2021 | Wei et al. | |
| 2022/0353660 A1* | 11/2022 | Ye | H04W 24/08 |
| 2024/0243893 A1* | 7/2024 | Park | H04L 5/0048 |

FOREIGN PATENT DOCUMENTS

| | | |
|---|---|---|
| CN | 103457711 A | 12/2013 |
| CN | 103563273 A | 2/2014 |
| CN | 103621032 A | 3/2014 |
| CN | 104904135 A | 9/2015 |
| CN | 105612709 A | 5/2016 |
| CN | 105656597 A | 6/2016 |
| CN | 105794287 A | 7/2016 |
| CN | 105827371 A | 8/2016 |
| CN | 106160974 A | 11/2016 |
| CN | 106162874 A | 11/2016 |
| CN | 107046721 A | 8/2017 |
| EP | 3264829 A1 | 1/2018 |
| EP | 3300287 A1 | 3/2018 |
| EP | 3522433 A1 | 8/2019 |
| EP | 3439389 B1 | 12/2021 |
| JP | 2017139673 A | 8/2017 |
| JP | 2018533877 A | 11/2018 |
| JP | 2019500795 A | 1/2019 |
| JP | 2020507277 A | 3/2020 |
| JP | 2020513227 A | 5/2020 |
| JP | 2021503206 A | 2/2021 |
| KR | 20030018280 A | 3/2003 |
| KR | 20160137347 A | 11/2016 |
| KR | 20170003547 A | 1/2017 |
| KR | 20170012150 A | 2/2017 |
| WO | 2009049167 | 4/2009 |
| WO | 2014042373 A1 | 3/2014 |
| WO | 2014165838 | 10/2014 |
| WO | 2014186456 | 11/2014 |
| WO | 2015018368 A1 | 2/2015 |
| WO | 2016119162 A1 | 8/2016 |
| WO | 2016119446 A1 | 8/2016 |
| WO | 2016123292 A1 | 8/2016 |
| WO | 2016154835 A1 | 10/2016 |
| WO | 2016159697 A1 | 10/2016 |
| WO | 2016172293 | 10/2016 |
| WO | 2016182639 A1 | 11/2016 |
| WO | 2016186044 A1 | 11/2016 |
| WO | 2016190537 A1 | 12/2016 |
| WO | 2016190620 A1 | 12/2016 |

(56) References Cited

FOREIGN PATENT DOCUMENTS

| WO | 2016209833 A1 | 12/2016 |
|---|---|---|
| WO | 2017011093 | 1/2017 |
| WO | 2017011105 | 1/2017 |
| WO | 2017078802 A1 | 5/2017 |
| WO | 2017136003 A1 | 8/2017 |
| WO | 2017167839 A1 | 10/2017 |
| WO | 2018026199 A1 | 2/2018 |
| WO | 2018030936 A1 | 2/2018 |
| WO | 2018152027 | 8/2018 |
| WO | 2019096431 A1 | 5/2019 |

OTHER PUBLICATIONS

3GPP TS 36.213: "3rd Generation Partnership Project; Technical Specification Group Radio Access Network; Evolved Universal Terrestrial Radio Access (E-UTRA); Physical Layer Procedures (Release 14)", V14.1.0 (Dec. 2016), Jan. 2, 2017, pp. 384-402, 66-78, URL: http://www.3gpp.org/ftp/Specs/archive/36_series/36.213/36213-e10.zip.

"3rd Generation Partnership Project; Technical Specification Group Radio Access Network; Evolved Universal Terrestrial Radio Access (EUTRA); Physical Channels and Modulation (Release 14)", 3GPP Standard; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V14.1.0, Jan. 2, 2017 (Jan. 2, 2017), XP051230335, pp. 140-175, [retrieved on Jan. 2, 2017].

Alcatel-Lucent Shanghai Bell: "Considerations of TDD NB-IOT" [online], 3GPP TSG RAN WG1 adhoc_LTE_NB-IOT_1601 R1-160181, Nov. 8, 2016, 4 Pages, Internet URL: http://www.3gpp.org/ftp/tsg_ran/WG1_RL1/TSGR1_AH/LTE_NB-IOT_1601/Docs/R1-160181.zip.

Ericsson: "NB-IoT—Synchronization Channel Design", 3GPP TSG-RAN WG1 NB-IoT AdHoc, R1-160079, Jan. 18-22, 2016, Budapest, Hungary, pp. 1-6.

Ericsson: "Power Consumption and Latency Reduction by Increasing the Maximum NPUSCH Transport Block Size", 3GPP TSG-RAN1#86bis, R1-1610399, Oct. 10-14, 2016, pp. 1-4.

Huawei, et al., "DCI for NB-IoT", 3GPPTSG-RAN WG1 NB-IoT Ad-Hoc Meeting, 3GPP Draft, R1-160032, 3rd Generation Partnership Project (3GPP), Mobile Competence Centre, 650, Route Des Lucioles, F-06921 Sophia-Antipolis Cedex, France, vol. RAN WG1, No. Budapest, HU, Jan. 18, 2016-Jan. 20, 2016, Jan. 17, 2016 (Jan. 17, 2016), 3 Pages, XP051053355, sections 2. 2.1, 3.

Huawei., et al., "On Multi-PRB Operation", 3GPP TSG RAN WG1Meeting #84, R1-161039, 3rd Generation Partnership Project, Mobile Competence Centre, 650, Route Des Lucioles, F-06921, Sophia-Antipolis Cedex, France, vol. RAN WG1, No. St Julian's, Malta, Feb. 15, 2016-Feb. 19, 2016, Feb. 14, 2016, 3 Pages, XP051054343.

Huawei., et al., "Remaining Details of NB-PDCCH Design", 3GPP TSG RAN WG1 NB-IoT Ad-Hoc Meeting #2, R1-161802, Sophia-Antipolis, France, Mar. 22-24, 2016, 5 Pages.

Huawei, et al., "TDD Support for NB-IoT in Rel-15", 3GPP TSG RAN Meeting #74, 3GPP draft, RP-162161, 3rd Generation Partnership Project (3GPP), Mobile Competence Centre; 650, Route Des Lucioles; F-06921 Sophia-Antipolis Cedex; France, vol. TSG RAN, No. Vienna, Austria; Dec. 5, 2016-Dec. 8, 2016, Dec. 4, 2016 (Dec. 4, 2016), XP051183589, pp. 1-9.

Huawei, et al., "TS 36.300 Section 5 for NB-IoT up to RAN1#84," 3GPP Draft; R1-161554, 3rd Generation Partnership Project (3GPP), Mobile Competence Centre; 650, Route Des Lucioles; F-06921 Sophia-Antipolis Cedex; France, vol. RAN WG1, No. St Julian's, Malta; Feb. 15, 2016-Feb. 19, 2016, Mar. 2, 2016, XP051079463, Retrieved from the Internet: URL: http://www.3gpp.org/ftp/tsg_ran/WG1_RL1/TSGR1_84/Docs/ [retrieved on Mar. 2, 2016], 16 pages.

Huawei, et al., "Synchronization Signal Design", 3GPP Draft, 3GPP TSG RAN WG1 Meeting #84, R1-160311, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 14, 2016 (Feb. 14, 2016), 10 Pages, XP051053651, the whole document.

Intel Corporation: "Design of Synchronization Signals and System Information for TDD Support in feNB-IoT", 3GPP Draft, R1-1717347, 3GPP TSG RAN WG1 Meeting #90bis, 3rd Generation Partnership Project (3GPP), Mobile Competence Centre, 650, Route Des Lucioles, F-06921 Sophia-Antipolis Cedex, France, vol. RAN WG1. No. Prague. Czech Republic, Oct. 9, 2017-Oct. 13, 2017, Oct. 8, 2017 (Oct. 8, 2017), XP051340537, pp. 1-7, pp. 3,4.

Intel Corporation: "Frame Structure for New Radio Interface," 3GPP TSG RAN WG1 Meeting #84bis, R1-162726, Busan, Korea Apr. 11-15, 2016, (Apr. 1, 2016), 5 pages.

Intel Corporation: "On Layer 1 Design and Procedures for NB-IoT Downlink", 3GPP TSG RAN WG1 Meeting #83, R1-156529, Nov. 7, 2015, 8 Pages.

International Search Report and Written Opinion—PCT/CN2018/103208—ISA/EPO—Oct. 29, 2018.

International Search Report and Written Opinion—PCT/CN2017/111308—ISA/EPO—Jul. 30, 2018.

Lenovo., et al., "Views on TDD Downlink Aspect for R.15 NBIoT," 3GPP TSG RAN WG1 Meeting #90bis, R1-1717440, Prague, P.R. Czech Oct. 9-13, 2017 (Oct. 13, 2017), 5 pages.

LG Electronics: "Discussion on Multiple PRB Operation for SIB1 Transmission" [online], 3GPP Draft, 3GPPTSG RAN1 #84, R1-160615 NB-SIB, 3rd Generation Partnership Project (3GPP), Mobile Competence Centre, 650, Route Des Lucioles, F-06921, Sophia-Antipolis Cedex, France, vol. RAN WG1, No. St. Julian's, Malta, Feb. 15, 2016-Feb. 19, 2016 Feb. 14, 2016, XP051053944, 3 Pages.

LG Electronics: "Discussion on PDSCH Transmission for MTC", 3GPP TSG RAN WG1 Meeting #82, R1-154235, Beijing, China, 3GPP (Server Release Date: Aug. 14, 2015), pp. 1-11, Aug. 24, 2015-Aug. 28, 2015.

Nokia, et al., "Existing Downlink Signals for OTDOA Positioning in NB-IoT", 3GPP TSG RAN WG1 Meeting #86bis, 3GPP Draft, R1-1608881, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016, 3 Pages, XP051148935.

Nokia Networks., et al., "Synchronization Signal Design for NB-IoT", [online], 3GPP TSG-RAN WG1 # 84 R1-160449, Feb. 5, 2016, 7 Pages, Retrieved from the Internet URL: http://www.3gpp.org/ftp/tsg_ran/WG1_RL1/ TSGR1_84/Docs/R1-160449.zip.

Nokia Networks, et al., "Synchronization Signal Design for NB-IoT", 3GPP TSG-RAN WG1 Meeting # 84, 3GPP Draft, R1-161104, 3rd Generation Partnership Project (3GPP), vol. RAN WG1, No. St Julian's, Malta, Feb. 15, 2016-Feb. 19, 2016, Feb. 24, 2016 (Feb. 24, 2016), XP051079077, 7 pages, Retrieved from the Internet: URL: http://www.3gpp.org/ftp/tsg_ran/WG1_RL1/TSGR1_84/Docs/ [retrieved on Feb. 24, 2016], the whole document.

Nokia Networks: "On the Synchronization Signal Design for NB-IoT", 3GPP TSG-RAN WG1 Meeting #83, 3GPP Draft, R1-157274, 3rd Generation Partnership Project (3GPP), Mobile Competence Centre, 650, Route Des Lucioles, F-06921, Sophia-Antipolis Cedex, France, vol. RAN WG1, No. Anaheim, USA, Nov. 15, 2015-Nov. 22, 2015, Nov. 15, 2015, 9 Pages, XP051003479, the whole document.

Nokia Networks: "On the TDD Support for NB-IoT", 3GPP Draft, 3GPP TSG RAN WG1 NB-IoT Adhoc, R1-160011, 3rd Generation Partnership Project (3GPP), Mobile Competence Centre, 650, Route Des Lucioles, F-06921 Sophia-Antipolis Cedex, France, vol. RAN WG1, No. Budapest, HU, Jan. 18-20, 2016, Jan. 17, 2016 (Jan. 17, 2016), XP051053334, 3 pages.

Nokia Networks: "Synchronization Signal Design for NB-IoT", 3GPP TSG-RAN WG1 NB-IoT Adhoc, R1-160012, Budapest, Hungary, Jan. 18-20, 2016, 7 Pages.

NTT DOCOMO: "Views on Remaining Issues of NB-PDSCH", 3GPP TSG RAN WG1 Meeting #84bis, R1-163168, Busan, Korea Apr. 11-15, 2016, pp. 1-4.

Qualcomm Incorporated: "Physical Channel Time and Frequency Relationship",3GPPTSG RAN WG1 #82 BIS, 3GPP Draft, R1-155704, Physical Channel Time and Frequency Relationship, 3rd Generation Partnership Project (3GPP), Mobile Competence Centre, 650, Route

(56) References Cited

OTHER PUBLICATIONS

Des Lucioles, F-06921, Sophia-Antipolis Cedex, vol. RAN WG1, No. Malmo, Sweden, Oct. 5, 2015-Oct. 9, 2015, Oct. 4, 2015 (Oct. 4, 2015), XP051002533, 6 pages, Sections 1-3.
Rapporteur W (Ericsson): "RAN1 Agreements for Rel-13 eMTC Sorted and Edited by Topic," 3GPP Draft, 3GPP TSG RAN WG1 Meeting #84, R1-161546, RAN1 Agreements for Rel-13 eMTC Sorted by Topic with SPEC Impacts—with Change Tracking, 3rd Generation Partnership Project (3GPP), Mobile Competence Centre; 650, Route Des Luc, vol. RAN WG1, No. St Julian's, Malta; Feb. 15, 2016-Feb. 19, 2016, Feb. 24, 2016, XP051079451, 44 pages.
Samsung: "Discussion on DL Common Channel/Signal for TDD NB-IoT", 3GPP Draft, R1-1713549, 3GPP TSG RAN WG1 Meeting #90, 3rd Generation Partnership Project (3GPP), Mobile Competence Centre, 650, Route Des Lucioles, F-06921 Sophia-Antipolis Cedex, France, vol. RAN WG1. No. Prague. Czechia, Aug. 21, 2017-Aug. 25, 2017, Aug. 20, 2017 (Aug. 20, 2017), XP051316349, pp. 1-4, pp. 1-4, Paragraph 2 and Fig. 2.
Samsung: "Discussion on DL Common Channel/Signal for TDD NB-IoT," 3GPP TSG RAN WG1 Meeting #90bis, R1-1717570, Prague, CZ, Oct. 9-13 2017 (Oct. 13, 2017), pp. 1-4.
Samsung: "Discussion on Forward Compatibility for NR," 3GPP Draft; R1-166743, Forward Compatibility Final, 3rd Generation Partnership Project (3GPP), Mobile Competence Centre; 650, Route Des Lucioles; F-06921, Sophia-Antipolis Cedex; France vol. RAN WG1, No. Gothenburg, Sweden; Aug. 22, 2016-Aug. 26, 2016, Aug. 21, 2016, pp. 1-4, XP051125541.
Session Chairman (Qualcomm Inc): "Summary of Ad-Hoc Session on Further LTE Physical Layer Enhancements for MTC", 3GPP TSG RAN WG1 Meeting #83, R1-157892, Anaheim, CA, USA, Nov. 16, 2015-Nov. 20, 2015, 23 Pages, 3GPP Server Publication Nov. 24, 2015 (Nov. 24, 2015).
Spreadtrum Communications: "Discussion on NB-PDSCH/NB-PUSCH Transmission for NB-IoT", 3GPP TSG RAN WG1 NB-IoT Ad-Hoc Meeting, R1-161964, Sophia Antipolis, France, 3GPP (Server Release Date: Mar. 15, 2016), 3 Pages, Mar. 22, 2016-Mar. 24, 2016.
Supplementary European Search Report—EP18879196—Search Authority—Munich—Jul. 5, 2021.
Taiwan Search Report—TW107140776—TIPO—Dec. 16, 2021.
Wei H., "The Optimization of TD-LTE Special Sub-Frame Configuration" Optimal Design of TD-LTE Special Subframe Ratio, Mobile Communications, Issue 6, May 26, 2014, 5 Pages.

Wi Rapporteur (Ericsson): "RAN1 Agreements for Rel-13 NB-IoT", 3GPP TSG-RAN WG1 Meeting #85, 3GPP Draft; R1-165977, 3rd Generation Partnership Project (3GPP), Mobile Competence Centre, 650, Route Des Lucioles, F-06921, Sophia-Antipolis Cedex, France, vol. RAN WG1, No. Nanjing, China; Aug. 11, 2016, 33 pages, May 22, 2016-May 26, 2016, XP051141850, Sections 3,8.
Wi Rapporteur (Ericsson): "RAN1 Agreements for Rel-13 NB-IoT" [online], 3GPP TSG-RAN WG1 NB-IoT Ad-Hoc Meeting R1-162038, Mar. 24, 2016, 19 Pages, URL: http://www.3gpp.org/ftp/tsg_ran/WG1_RL1/TSGR1_AH/LTE_NB-IOT_1603/Docs/R1-162038.zip.
ZTE: "Detailed Design on Downlink Aspects to Support TDD NB-IoT", 3GPP Draft, 3GPP TSG RAN WG1 Meeting #90bis, R1-1717202, Downlink Aspects for NB-IoT TDD, 3rd Generation Partnership Project (3GPP), Mobile Competence Centre, 650, Route Des Lucioles, F-06921 Sophia-Antipolis Cedex, France, vol. RAN WG1. No. Prague. Czechia, Oct. 9, 2017-Oct. 13, 2017, Sep. 30, 2017 (Sep. 30, 2017), XP051351801, 7 Pages, pp. 1-3, Figs. 1 and 2.
ZTE: "NB-PSS and NB-SSS Design for NB-IoT", 3GPP TSG RAN WG1 Meeting #84, 3GPP Draft, R1-161221 NB-PSS and NB-SSS_Updated, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016, Feb. 24, 2016 (Feb. 24, 2016), 9 Pages, XP051079157.
ZTE: "Remaining Issues on NB-PDCCH Design of NB-IoT", 3GPP TSG RAN WG1 Meeting #84bis, R1-162757, Busan, Korea, Apr. 11-5, 2016, pp. 1-5.
ZTE: "Support of HARQ-ACK Bundling for MTC", R1-1609830, 3GPP TSG RAN WG1 Meeting #86bis, Lisbon, Portugal, Oct. 10-14, 2016, 5 Pages.
Huawei, et al., "TDD Support in NB-IoT", 3GPP TSG-RAN WG2 Meeting #99bis, R2-1711332, Prague, Czech Republic, Oct. 9-13, 2017, pp. 1-9.
LG Electronics: "Discussion on PDSCH transmission for MTC", 3GPP TSG RAN WG1 Meeting #81, R1-152701, Fukuoka, Japan, May 25-29, 2015, pp. 1-9.
Samsung: "DL/UL HARQ Timing for Low Cost MTC UEs in Enhanced Coverage", 3GPP TSG RAN WG1 #80b, R1-151586, No. Belgrade, Serbia, Apr. 20, 2015-Apr. 24, 2015, 3 Pages.
Sony: "Monitoring of NPDCCH after NPDSCH/NPUSCH Transmission", 3GPP TSG RAN WG1 Meeting #85, R1-164291, No. Nanjing, China, May 24, 2016-May 27, 2016, 2 Pages.
Deutsche Telekom, et al., "Way Forward NB-IOT and EMTC Evolution and UE Capability", 3GPP TSG RAN Meeting #76, RP-171420, West Palm Beach, USA, Jun. 5-8, 2017, 4 Pages.

* cited by examiner

TECHNIQUES AND APPARATUSES FOR CARRIER MANAGEMENT

CROSS-REFERENCE TO RELATED APPLICATIONS UNDER 35 U.S.C. § 119

This application claims priority to U.S. patent application Ser. No. 16/756,729 filed on Apr. 16, 2020, entitled "TECHNIQUES AND APPARATUSES FOR CARRIER MANAGEMENT," which is a 371 national stage of PCT Application No. PCT/CN2018/103208 filed on Aug. 30, 2018, entitled "TECHNIQUES AND APPARATUSES FOR CARRIER MANAGEMENT," which claims priority to Patent Cooperation Treaty (PCT) Patent Application No. PCT/CN2017/111308, filed on Nov. 16, 2017, entitled "TECHNIQUES AND APPARATUSES FOR CARRIER MANAGEMENT," which are hereby expressly incorporated by reference herein.

BACKGROUND

Field

Aspects of the present disclosure generally relate to wireless communication, and more particularly to techniques and apparatuses for carrier management.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

A BS and a UE may communicate using a carrier. For example, in narrowband Internet of Things (NB-IoT) time division duplex (TDD) operation, a BS and a UE may communicate using a group of channels, such as a broadcast channel, a shared channel, a downlink channel, an uplink channel, and/or the like, conveyed using at least one carrier. A first physical resource block (PRB) may include a narrowband primary synchronization signal, a narrowband secondary synchronization signal, and/or the like. The first PRB may be the anchor carrier for a network. One or more second PRBs may be configured using system information block signaling, radio resource control signaling, and/or the like as non-anchor carriers for paging, random access procedures, and unicast transmissions.

A system information block type 1 narrowband (SIB1-NB) message may be transmitted on an anchor carrier, and may be multiplexed with a narrowband secondary synchronization signal, such as in a time division multiplexed communication system. In some cases, the SIB1-NB may be transmitted on a non-anchor carrier, such as based at least in part on an indication associated with a master information block, which may reduce inter-cell interference for the SIB1-NB, such as when a quantity of repetitions of the SIB1-NB from a set of neighboring cells is greater than a threshold quantity. However, a frequency, a time, a quantity of repetitions, a power, and/or the like associated with transmission of a SIB1-NB on a non-anchor carrier may not be configured.

SUMMARY

Some aspects, described herein, may provide a mechanism for carrier management. For example, a BS may determine a frequency domain location parameter, a time domain location parameter, and/or the like for transmitting a message. Similarly, a UE may identify a plurality of carriers, and may transmit a connection request message (e.g., a Msg3 type message) using at least one of the plurality of carriers. In this case, the at least one carrier may be different for a connection request message than for a random access channel message, thereby reducing a time delay associated with transmitting the connection request message and reducing a likelihood of collision between the connection request message and the random access channel message. In this way, the BS and the UE may enable messaging using a non-anchor carrier, such as for a SIB1-NB message, a connection request message (e.g., a msg3 type message), and/or the like.

In an aspect of the disclosure, methods, a user equipment, a base station, apparatuses, and computer program products are provided.

In some aspects, the method may include transmitting, by a base station, a master information block message including an indicator identifying a frequency domain location parameter or a time domain location parameter for a non-anchor carrier or an anchor carrier. The method may include transmitting, by the base station and using the non-anchor carrier or the anchor carrier, a system information block type 1 (SIB1) message to a user equipment in accordance with the frequency domain location parameter or the time domain location parameter.

In some aspects, the base station may include a memory and at least one processor coupled to the memory. The memory and the at least one processor may be configured to transmit a master information block message including an indicator identifying a frequency domain location parameter or a time domain location parameter for a non-anchor carrier or an anchor carrier. The memory and the at least one processor may be configured to transmit, using the non-anchor carrier or the anchor carrier, a system information block type 1 (SIB1) message to a user equipment in accordance with the frequency domain location parameter or the time domain location parameter.

In some aspects, the apparatus may include means for transmitting a master information block message including an indicator identifying a frequency domain location parameter or a time domain location parameter for a non-anchor carrier or an anchor carrier. The apparatus may include means for transmitting, using the non-anchor carrier or the anchor carrier, a system information block type 1 (SIB1) message to a user equipment in accordance with the frequency domain location parameter or the time domain location parameter.

In some aspects, the computer program product may include a non-transitory computer-readable medium storing computer executable code. The code may include code for transmitting a master information block message including an indicator identifying a frequency domain location parameter or a time domain location parameter for a non-anchor carrier or an anchor carrier. The code may include code for transmitting, using the non-anchor carrier or the anchor carrier, a system information block type 1 (SIB1) message to a user equipment in accordance with the frequency domain location parameter or the time domain location parameter.

In some aspects, the method may include transmitting, by the user equipment, a random access channel using a first carrier, of a plurality of carriers, in a time division duplex network for random access. The method may include transmitting, by the user equipment, a connection request message using a second carrier, of the plurality of carriers, that is different from the first carrier.

In some aspects, the user equipment may include a memory and at least one processor coupled to the memory. The memory and the at least one processor may be configured to transmit a random access channel using a first carrier, of a plurality of carriers, in a time division duplex network for random access. The memory and the at least one processor may be configured to transmit a connection request message using a second carrier, of the plurality of carriers, that is different from the first carrier.

In some aspects, the apparatus may include means for transmitting a random access channel using a first carrier, of a plurality of carriers, in a time division duplex network for random access. The apparatus may include means for transmitting a connection request message using a second carrier, of the plurality of carriers, that is different from the first carrier.

In some aspects, the computer program product may include a non-transitory computer-readable medium storing computer executable code. The code may include code for transmitting a random access channel using a first carrier, of a plurality of carriers, in a time division duplex network for random access. The code may include code for transmitting a connection request message using a second carrier, of the plurality of carriers, that is different from the first carrier.

Aspects generally include a method, apparatus, system, computer program product, non-transitory computer-readable medium, user equipment, base station, wireless communication device, access point, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
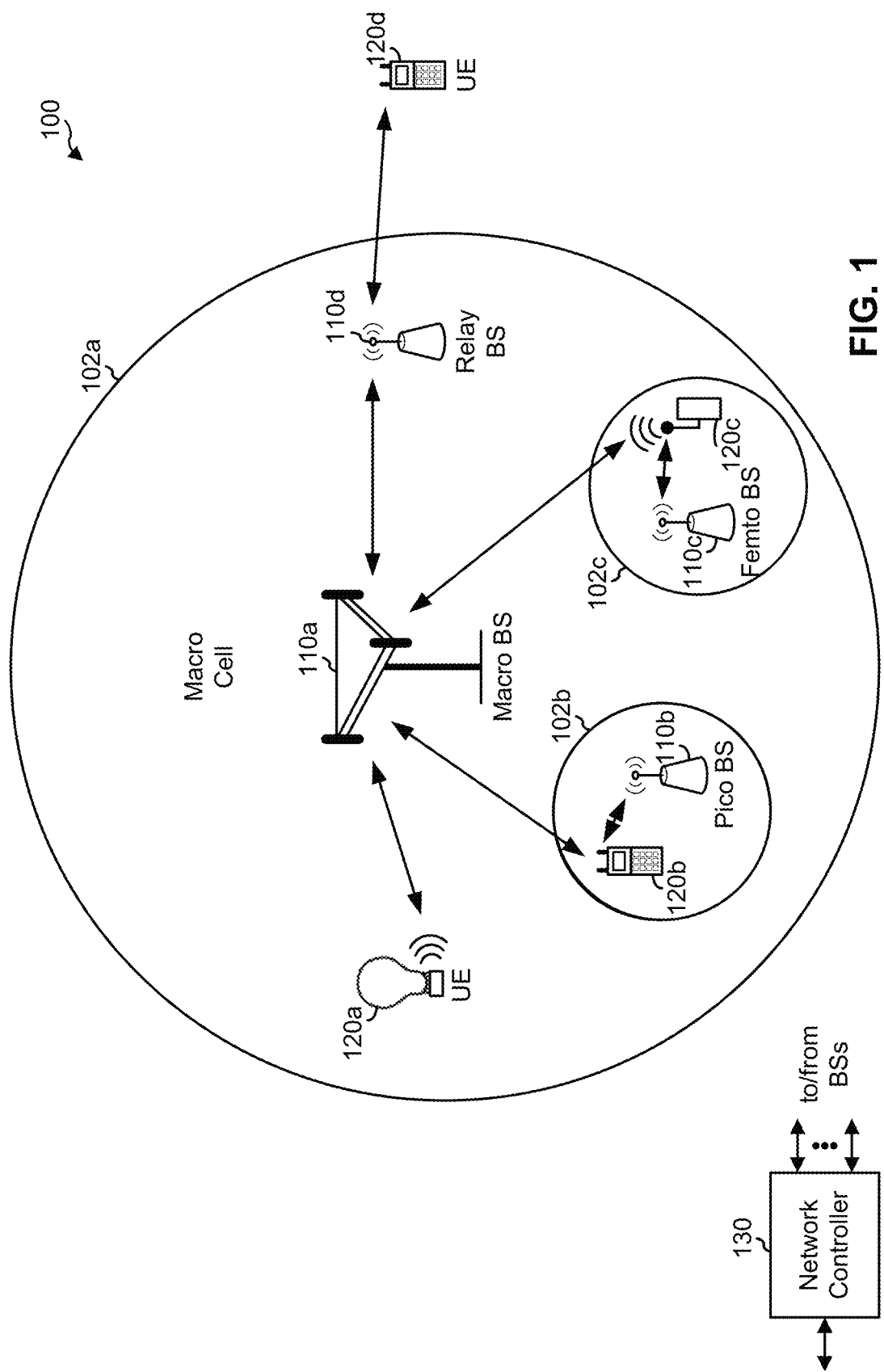
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. In some aspects, network controller 130 may determine a plurality of carriers that are to be used for communications. For example, network controller 130 may determine a first carrier for an anchor channel for narrowband Internet of Things (NB-IoT) time division duplex (TDD) communication, and at least one second carrier for a non-anchor channel for NB-IoT TDD communication. Additionally, network controller 130 may transmit a message to cause a connection request message to be transmitted using a different carrier than a random access channel request message, such as using a non-anchor carrier identified in a plurality of carriers.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone, such as UEs 120b and/or 120d), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices (e.g., such as UE 120c) wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, a smart home device (e.g., a smart appliance, a smart light bulb, and/or the like, such as UE 120a), or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered IoT devices, and/or may be implemented as may be implemented as NB-IoT devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
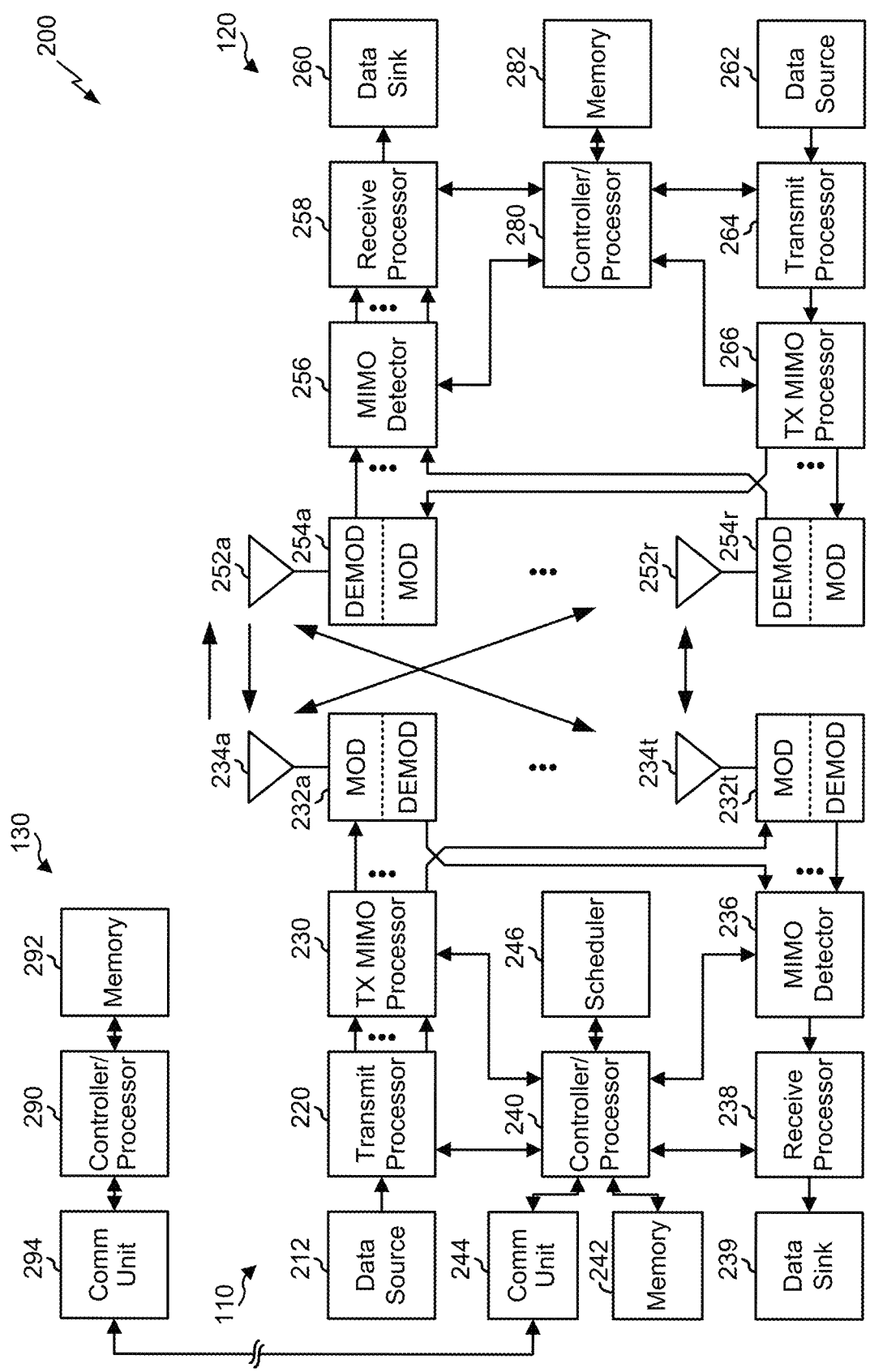
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). For example, transmit processor 220 may generate reference symbols associated with a system information block (SIB) message for transmission on a non-anchor carrier. A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. For example, transmit processor 264 may process data, such as data identifying a plurality of carriers, to enable transmission of a connection request message using a carrier of the plurality of carriers, such as an anchor carrier, a non-anchor carrier, and/or the like. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with carrier management, as described in more detail elsewhere herein. For example, controller/processor 240 of base station 110, controller/processor 280 of UE 120, and/or any other component(s) of FIG. 2 may perform or direct operations of, for example, method 1000 of FIG. 10, method 1300 of FIG. 13, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3:
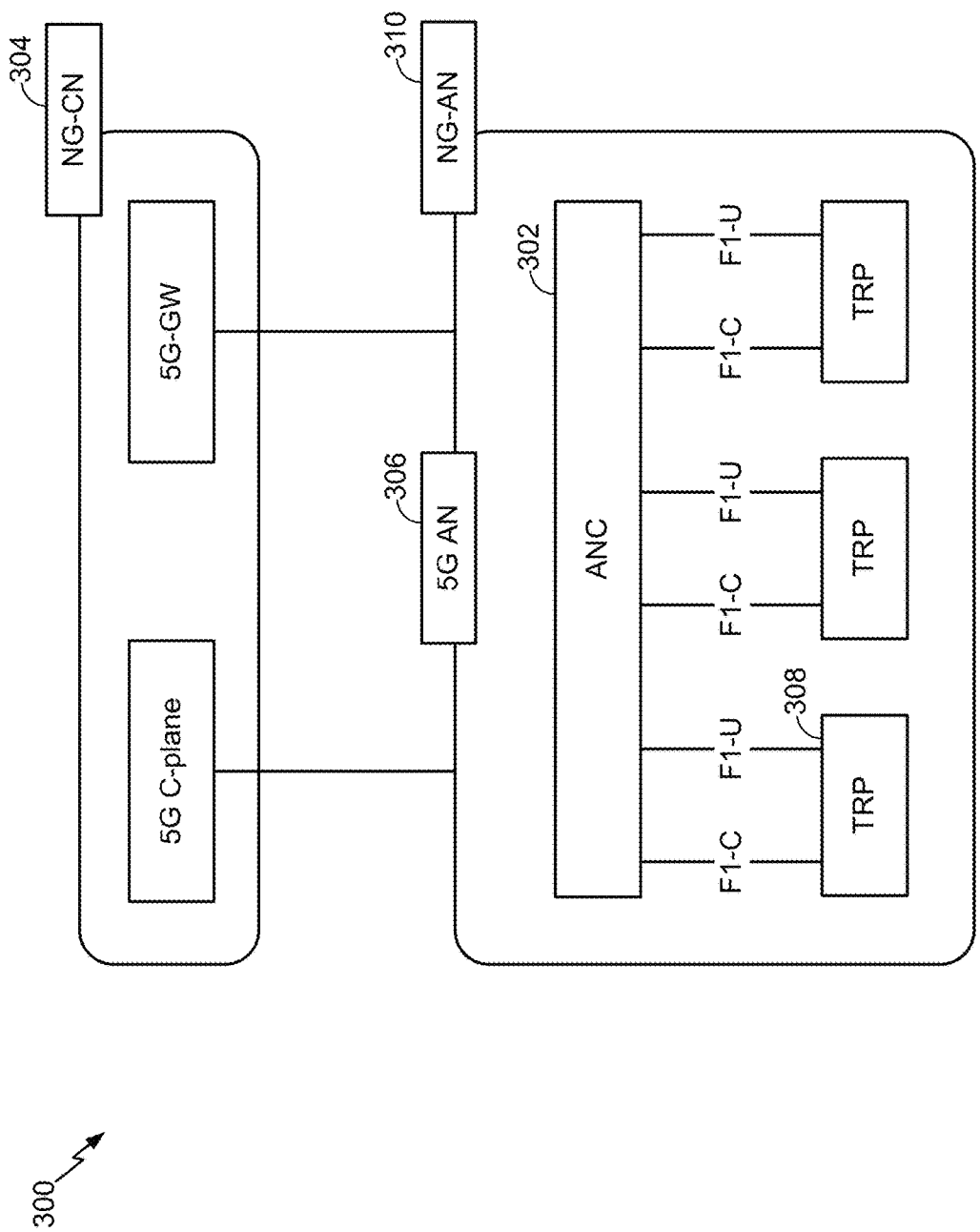
FIG. 3 is a diagram illustrating an example logical architecture of a distributed radio access network (RAN).

FIG. 3 illustrates an example logical architecture of a distributed RAN 300, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, 5G BSs, Node Bs, 5G NBs, APs, gNB, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 300 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 310 may support dual connectivity with 5G. The NG-AN may share a common fronthaul for LTE and 5G.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of RAN 300. The PDCP, RLC, MAC protocol may be adaptably placed at the ANC or TRP.

According to various aspects, a BS may include a central unit (CU) (e.g., ANC 302) and/or one or more distributed units (e.g., one or more TRPs 308).

As indicated above, FIG. 3 is provided merely as an example. Other examples are possible and may differ from what was described with regard to FIG. 3.

Figure 4:
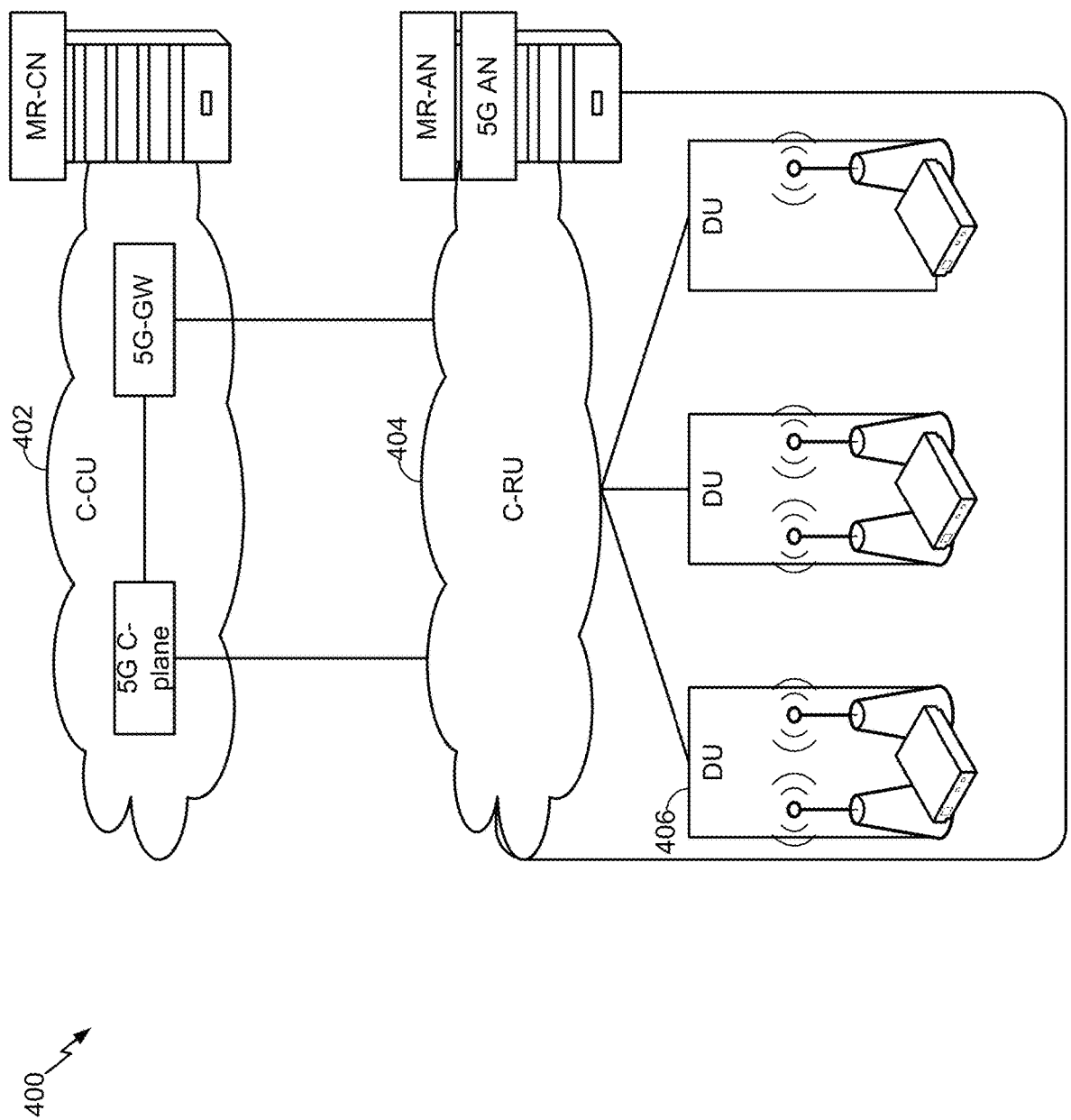
FIG. 4 is a diagram illustrating an example physical architecture of a distributed RAN.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity.

A centralized RAN unit (C-RU) 404 may host one or more ANC functions. Optionally, the C-RU may host core network functions locally. The C-RU may have distributed deployment. The C-RU may be closer to the network edge.

A distributed unit (DU) 406 may host one or more TRPs. The DU may be located at edges of the network with radio frequency (RF) functionality.

As indicated above, FIG. 4 is provided merely as an example. Other examples are possible and may differ from what was described with regard to FIG. 4.

Figure 5:
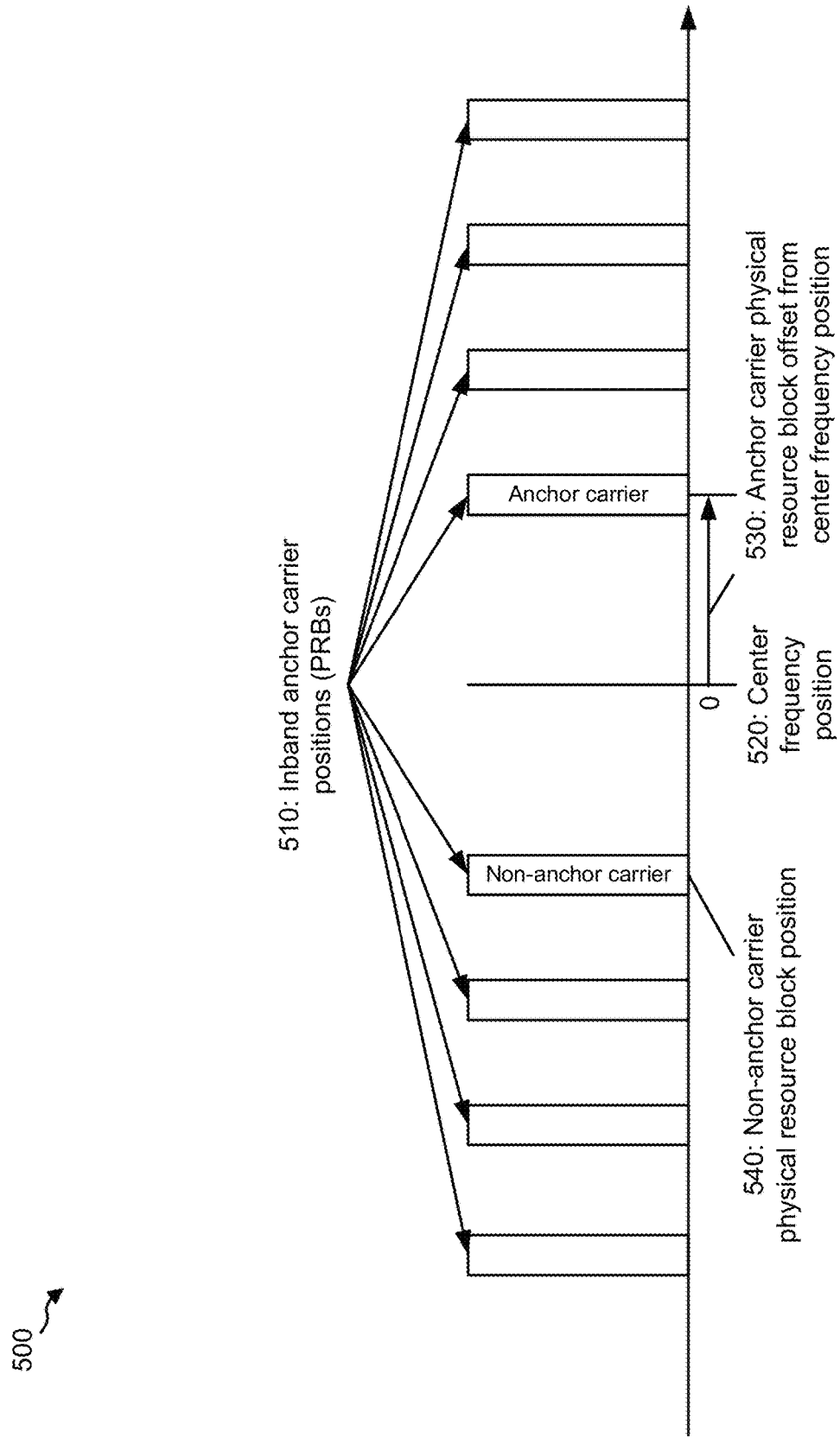
FIG. 5 is a diagram illustrating an example relating to carrier management.

FIG. 5 is a diagram illustrating an example 500 relating to carrier management for transmitting the SIB1-NB on the non-anchor carrier for NB-IoT inband deployment mode.

At 510, a base station (e.g., BS 110) may determine a frequency domain location for the anchor carrier from a plurality of potential frequency domain locations. For example, the base station may determine, based at least in part on stored information, the plurality of potential frequency domain locations for the anchor carrier.

At 520, the base station may determine a center frequency for an inband communication system (e.g., an LTE communication system).

At 530, the base station may identify an offset index value for the anchor carrier relative to the center frequency. In some aspects, the offset index value may be a physical resource block (PRB) index offset, P, for the anchor carrier relative to the center frequency. The base station may signal the index offset in a master information block (MIB) to enable a UE (e.g., UE 120) to determine the frequency location of the anchor carrier after decoding the MIB. In some aspects, the MIB may include a 1-bit indicator to indicate the frequency location, such as indicating a PRB adjacent to and at a lower frequency range than the center frequency or a PRB adjacent to and at a higher frequency range than the center frequency.

At 540, the base station may select, for a non-anchor carrier, another frequency domain location, such that the non-anchor carrier is at an opposite PRB to the anchor carrier relative to a center frequency position. For example, the base station may determine that a physical resource block index offset for the non-anchor carrier is an inverse of a physical resource block index offset for the anchor carrier. In other words, for an anchor carrier physical resource block index offset, P, the non-anchor carrier physical resource block index offset is —P. In this way, the base station obviates a need to transmit information to signal the frequency location of the non-anchor carrier for SIB-NB, thereby reducing utilization of network resources. The UE may determine a frequency domain location parameter identifying a frequency domain location of the non-anchor carrier based at least in part on the offset index of the anchor carrier, thereby reducing utilization of network resources relative to requiring separate messages to signal the frequency domain location of the anchor carrier and the frequency domain location of the non-anchor carrier.

As indicated above, FIG. 5 is provided as an example. Other examples are possible and may differ from what was described with respect to FIG. 5.

Figure 6:
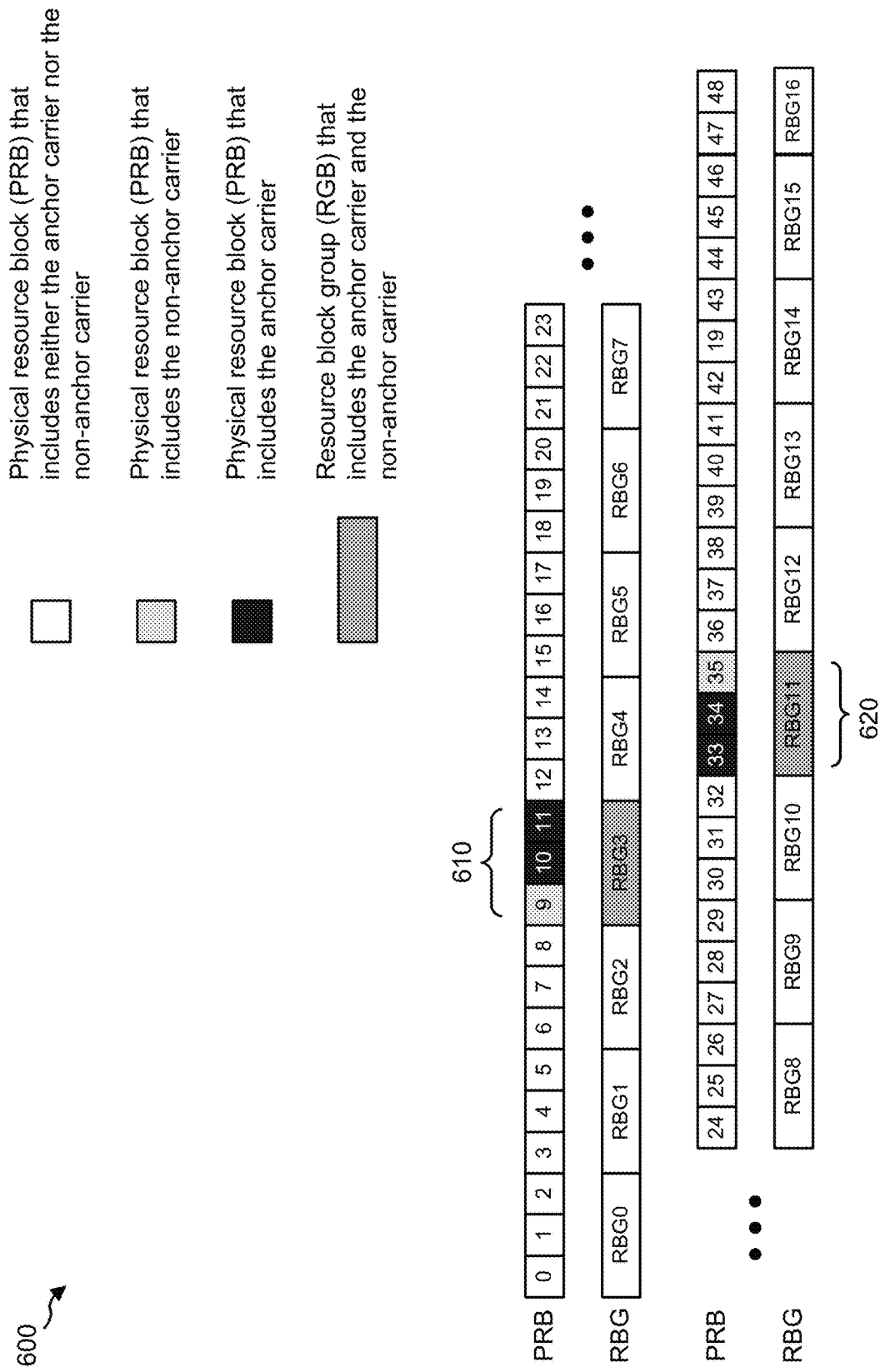
FIG. 6 is a diagram illustrating an example relating to carrier management.

FIG. 6 is a diagram illustrating an example 600 relating to carrier management.

At 610, a base station (e.g., BS 110) may determine to provide an anchor carrier and a non-anchor carrier in a common resource block group. For example, in an LTE communications system with a 10 megahertz (MHz) bandwidth, the base station may determine to use a physical resource block (PRB) with index 9 for an anchor carrier, and physical resource blocks with indices 10 and/or 11 for a non-anchor carrier. In this case, the physical resource blocks of the anchor carrier and the non-anchor carrier are included in a single resource block group of index 3 (RGB3), where the physical resource blocks for the non-anchor carrier (PRB 9) follow the physical resource block for the anchor carrier with a physical resource block offset value of 1 and/or 2 (PRB 10 and/or 11).

At 620, similarly, the base station may determine to use physical resource blocks with indices 33 and/or 34 for a non-anchor carrier and a physical resource block 35 for an anchor carrier. In this case, the physical resource blocks of the non-anchor carrier and the anchor carrier are included in a single resource block group of index 11 (RGB 11), where the physical resource block (PRB 35) for the non-anchor carrier follows the physical resource blocks for the anchor carrier with an offset value of −1 and/or −2 (PRB 34 and/or 33). In some aspects, one of a set of four physical resource block offset index values may be signaled to the UE using a two bit indicator, and the UE may identify the frequency of an non-anchor carrier based at least in part on the offset index value that is signaled. In this way, a degradation of physical resource block group utilization is reduced based at least in part on reducing a likelihood of misalignment of the carriers and the resource block groups for the inband LTE communication system.

As indicated above, FIG. 6 is provided as an example. Other examples are possible and may differ from what was described with respect to FIG. 6.

Figure 7:
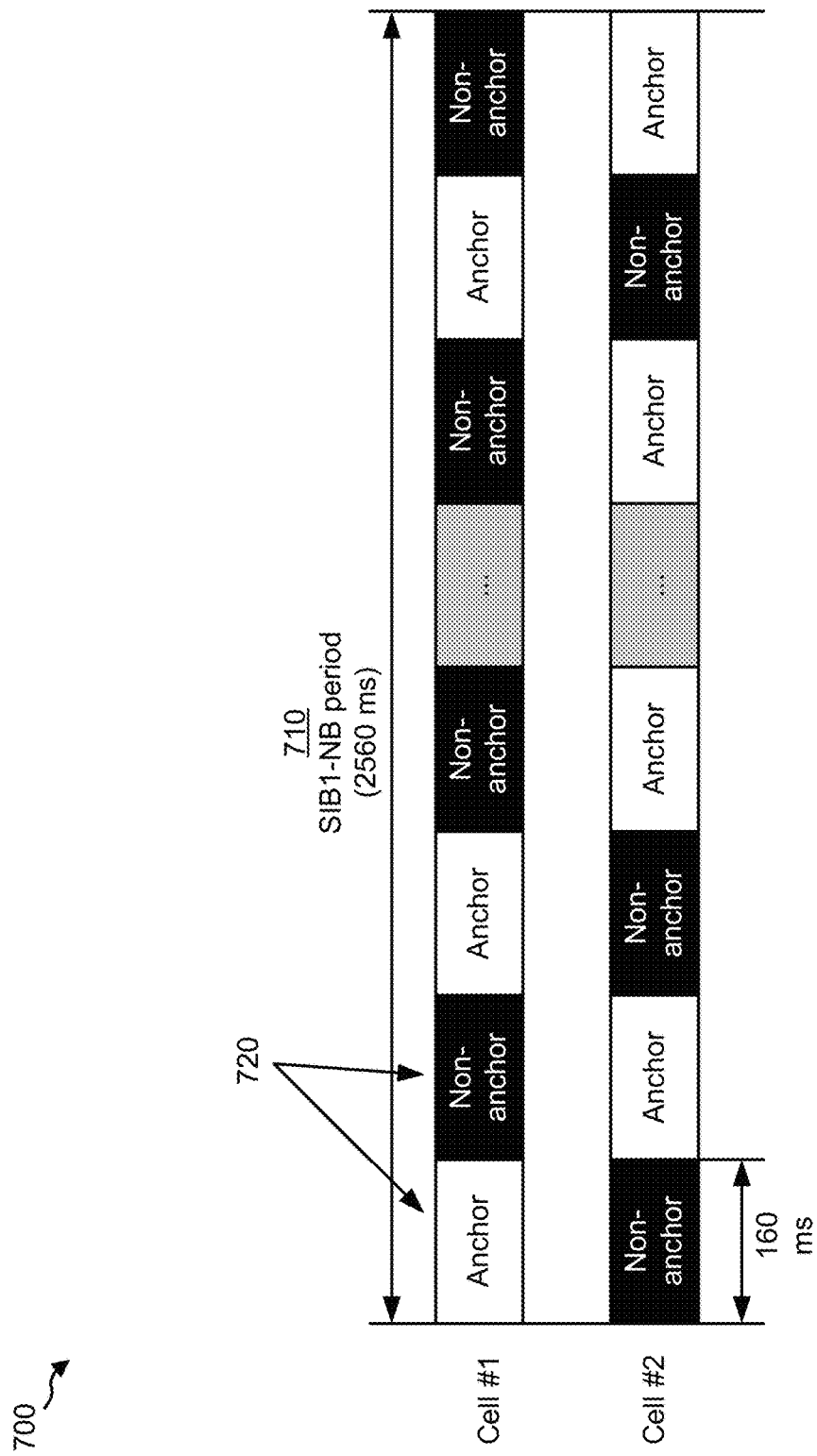
FIG. 7 is a diagram illustrating an example relating to carrier management.

FIG. 7 is a diagram illustrating an example 700 relating to carrier management for SIB1-NB on both an anchor and non-anchor carrier.

At 710, at least one base station (e.g., BS 110) may provide a plurality of cells for a SIB1-NB transmission. In some aspects, the SIB1-NB may be associated with a particular period, such as a 2560 millisecond (ms) period, which may be portioned into 160 ms increments for anchor carriers and non-anchor carriers with a transmission time interval (TTI) length of 80 ms for a SIB1-NB transmission. In some aspects, the SIB1-NB may be transmitted in a particular subframe of a particular radio frame, such as subframe 0 of alternating radio frames (e.g., subframe 0 of radio frames 1, 3, 5, etc. or of radio frames 2, 4, 6, 8, etc.), when transmitted on an anchor carrier. Additionally, or alternatively, when transmitted on a non-anchor carrier, the SIB1-NB may be transmitted on subframes 0 and 5 of alternating radio frames (e.g., subframe 0 and 5 of radio frames 1, 3, 5, etc. or of radio frames 2, 4, 6, 8, etc.).

At 720, the base station may transmit an anchor carrier and/or a non-anchor carrier via one or more cells of the plurality of cells. In some aspects, the base station may determine a power boosting parameter for transmissions of the anchor carrier and/or the non-anchor carrier. For example, for an inband operation mode or a guard band operation mode with a common power amplifier for physical resource blocks of a carrier, a power boosting for a non-anchor carrier for the SIB1-NB transmission may be 3 decibels (dB). In contrast, a power boosting for an anchor carrier may be 6 dB. As a result, the base station may assign a greater quantity of subframes for transmission of a SIB1-NB on the non-anchor carrier relative to a quantity of subframes for transmission of the SIB1-NB on the anchor carrier. For example, the base station may transmit the SIB1-NB in each subframe of index 0 and subframe of index 5 in alternating radio frames on the non-anchor carrier, and may transmit the SIB1-NB in each subframe of index 0 in alternating radio frames on the anchor carrier. In this case, the base station may transmit 16 repetitions of the SIB1-NB on the non-anchor carrier or 8 repetitions of the SIB1-NB on the anchor carrier. In some aspects, the base station may transmit the SIB1-NB on both the anchor carrier and the non-anchor carrier. For example, the base station may transmit one SIB1-NB repetition on the anchor carrier and two SIB1-NB repetitions on the non-anchor carrier.

In some aspects, the non-anchor carrier may be adjacent to the anchor carrier in a common guard band. In some aspects, the non-anchor carrier may at a frequency location opposite the anchor carrier in a guard band. In some aspects, the non-anchor carrier may be in an inband physical resource block (PRB) adjacent to the anchor carrier.

As indicated above, FIG. 7 is provided as an example. Other examples are possible and may differ from what was described with respect to FIG. 7.

Figure 8:
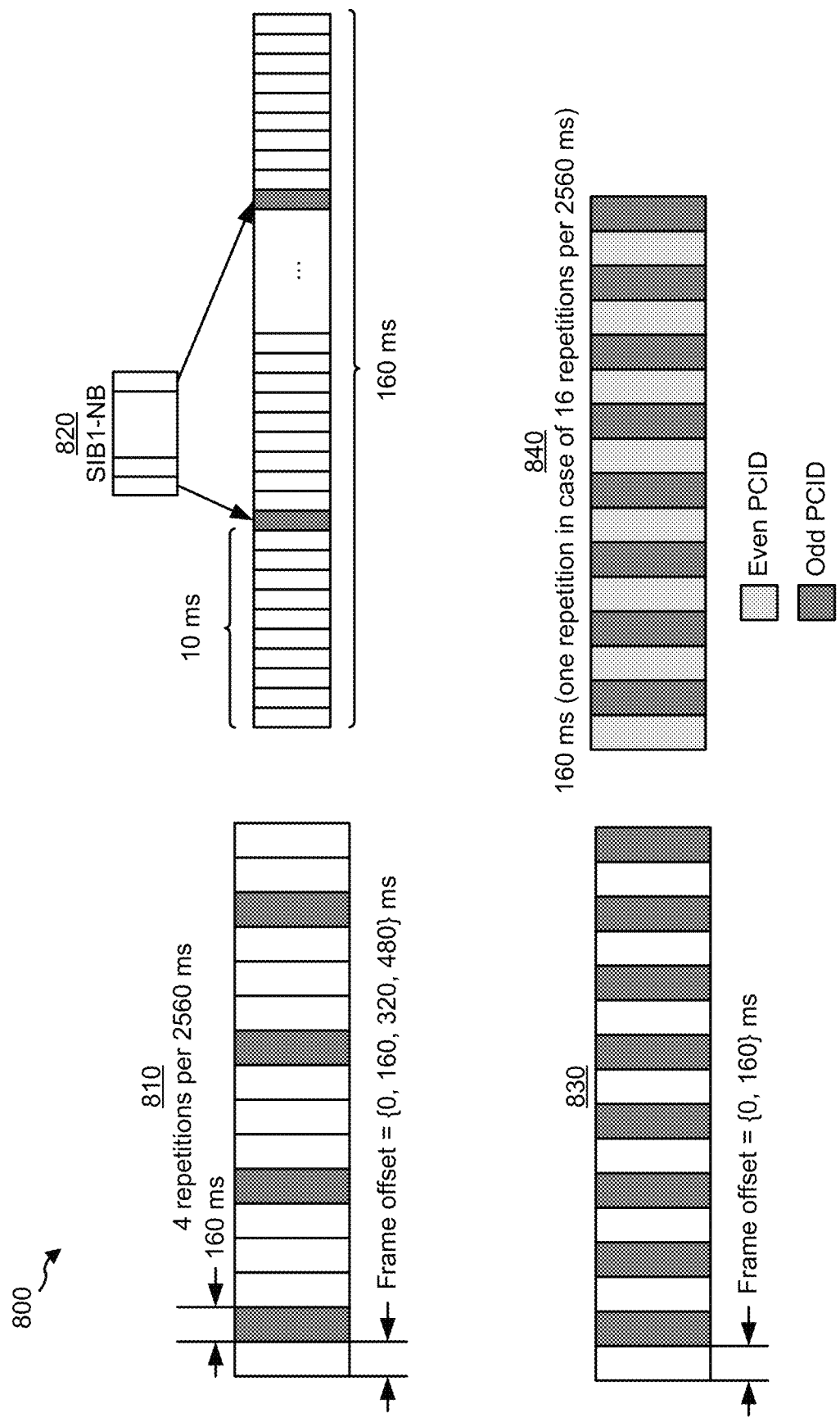
FIG. 8 is a diagram illustrating an example relating to carrier management.

FIG. 8 is a diagram illustrating an example 800 relating to carrier management for SIB1-NB on a non-anchor carrier.

As shown in FIG. 8, a base station (e.g., BS 110) may provide a SIB1-NB in a guard band operation mode with a plurality of power amplifiers or in a standalone mode. For example, the base station may provide the SIB1-NB with a common power boosting parameter for an anchor carrier and a non-anchor carrier. In this case, a quantity of subframes and frames for the SIB1-NB transmission can be common to the anchor carrier and the non-anchor carrier.

At 810 and 820, the base station may provide a set of 4 repetitions of a SIB1-NB transmission in each 2560 ms SIB1-NB period and using a carrier length of 160 ms. In this case, the base station may determine a frame offset of 0 ms, 160 ms, 320 ms, 480 ms, given the 2560 ms period. In some aspects, the base station may provide a SIB1-NB transmission in a 10 ms period of each 160 ms period within a carrier.

At 830 and 840, in contrast, the base station may provide a set of 8 repetitions of a SIB1-NB transmission in each 2560 ms period. In this case, the base station may determine a frame offset of 0 ms or 160 ms. In some aspects, the base station may transmit the SIB1-NB in subframe 0 of alternating radio frames. For example, the base station may select between transmitting in odd indexed radio frames or even indexed radio frames based at least in part on a cell identifier associated with a cell, a quantity of repetitions per SIB1-NB period, and/or the like. In this case, as shown, the base station may determine to transmit a first SIB1-NB for a cell with an even physical cell identity value (PCID) and a second SIB1-NB for a cell with an odd physical cell identity value in alternating portions of the SIB1-NB period.

As indicated above, FIG. 8 is provided as an example. Other examples are possible and may differ from what was described with respect to FIG. 8.

Figure 9:
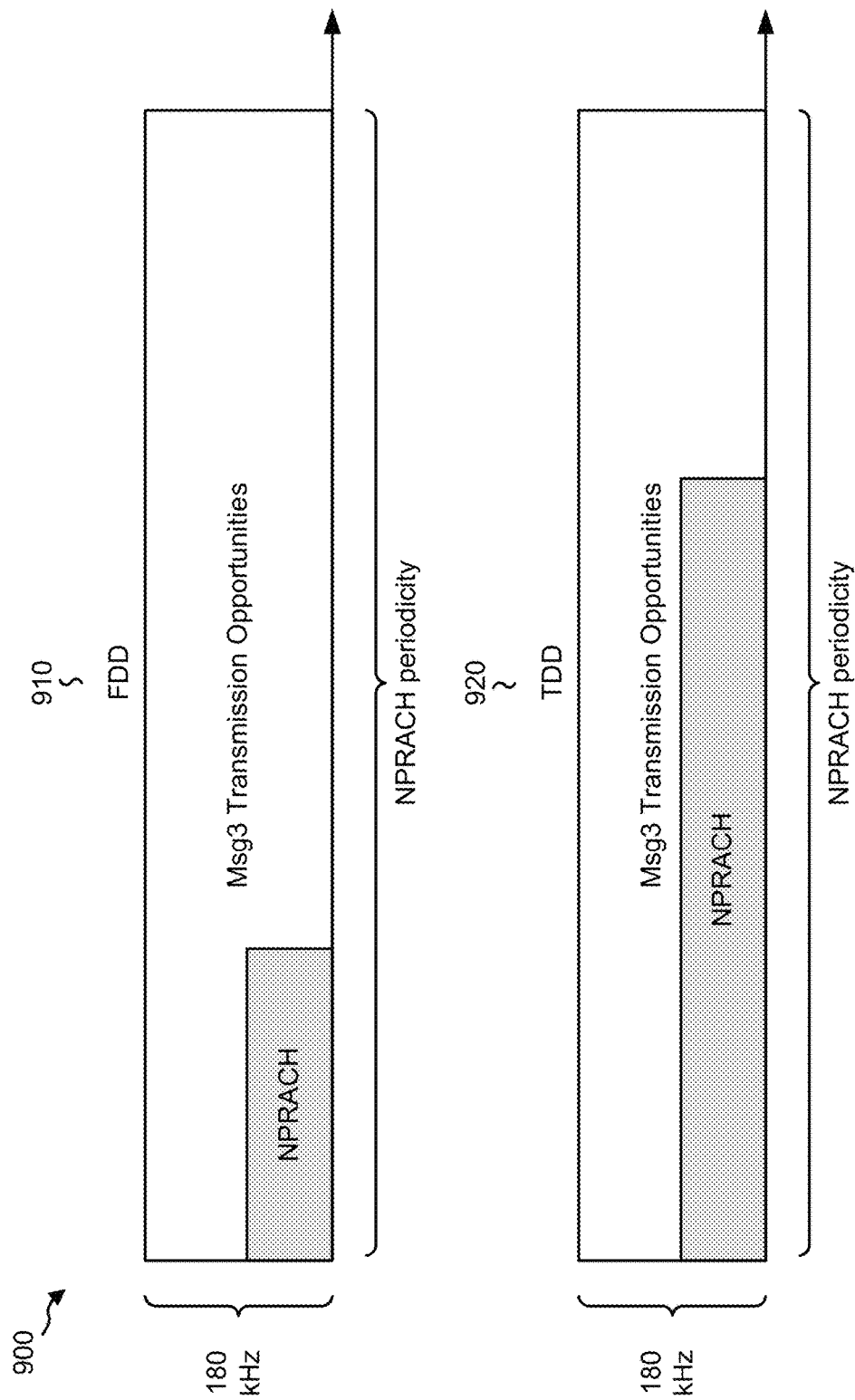
FIG. 9 is a diagram illustrating an example relating to carrier management.

FIG. 9 is a diagram illustrating an example 900 relating to carrier management for transmitting a random access message.

At 910, for a frequency division duplex (FDD) NB-IoT communications system, a user equipment (e.g., UE 120) may transmit a narrowband physical random access channel (NB-PRACH or NPRACH) and a connection request message (e.g., a Msg3 type message using a physical uplink shared channel PUSCH) on a common carrier. For example, the user equipment may transmit a 180 kilohertz (KHz) band channel with a particular NB-PRACH periodicity and with a first portion allocated for the NB-PRACH transmission and a second portion available for a connection request message. In some aspects, when a collision occurs for the NB-PRACH transmission and the connection request message, the user equipment may postpone transmission of the connection request message to a later uplink subframe not overlapping with an NB-PRACH resource.

At 920, for a time division duplex (TDD) NB-IoT communications system, the user equipment may transmit an NB-PRACH and a connection request message on one or more carriers. In some aspects, UE 120 may transmit the random access channel and the connection request message using a common carrier. In this case, postponing transmission of the connection request message may cause excessive delay as a result of less than a threshold quantity of uplink subframes being allocated for the user equipment, such as in a downlink-favored configuration. For example, in TDD configuration type 2, the user equipment may be allocated two uplink subframes in each frame and the NB-PRACH may be transmitted in portions of both of the two uplink subframes. In some aspects, the user equipment may permit the connection request message and the NB-PRACH to be transmitted on different carriers rather than on a common carrier as with FDD NB-IoT. In some aspects, UE 120 may transmit the random access channel using a first carrier and the connection request message using a second carrier that is different from the first carrier. For example, based at least in part on receiving a bit indicator in a random access response (RAR) message or in a system information block message, the user equipment may identify a plurality of carriers, such as two non-anchor carriers, an anchor carrier and a non-anchor carrier, and/or the like. In this case, the user equipment may transmit the NB-PRACH on a first carrier of the plurality of carriers (e.g., the anchor carrier or a non-anchor carrier of a plurality of non-anchor carriers) and the connection request message on the second carrier of the plurality of carriers (e.g., on a non-anchor carrier).

In some aspects, the user equipment may receive a message indicating different carriers for the NB-PRACH and the connection request message, and may determine whether to transmit the NB-PRACH and the connection request message on the different carriers based at least in part on whether the NB-PRACH can be multiplexed with the connection request message in a single physical resource block. For example, the user equipment may determine whether to transmit the NB-PRACH and the connection request message in the different carriers based at least in part on a quantity of NB-PRACH subcarriers, a transmission bandwidth for the connection request message, and/or the like.

As indicated above, FIG. 9 is provided as an example. Other examples are possible and may differ from what was described with respect to FIG. 9.

Figure 10:
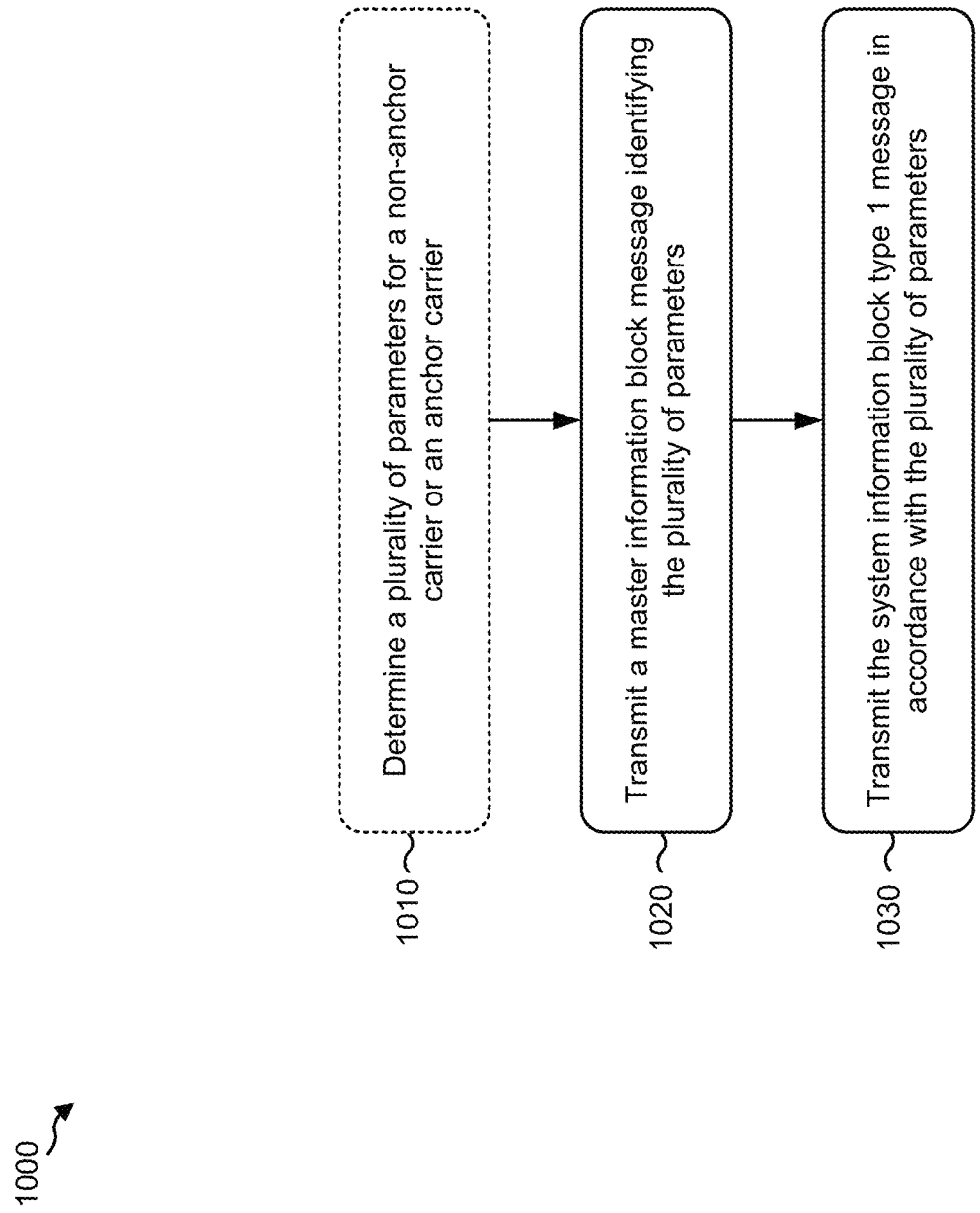
FIG. 10 is a flow chart of a method of wireless communication.

FIG. 10 is a flow chart of a method 1000 of wireless communication for transmitting the SIB1-NB on the non-anchor carrier. The method may be performed by a base station (e.g., the BS 110, the apparatus 1102/1102', the BS 1450, and/or the like).

At 1010, in some aspects, the base station may determine a plurality of parameters for a non-anchor carrier or an anchor carrier. For example, the base station (e.g., using controller/processor 240 and/or the like) may determine a plurality of parameters for at least one of a non-anchor carrier or an anchor carrier, wherein the plurality of parameters include a frequency domain location parameter and a time domain location parameter.

At 1020, the base station may transmit a master information block message identifying the plurality of parameters. For example, the base station (e.g., using controller/processor 240, transmit processor 220, TX MIMO processor 230, MOD 232, antenna 234, and/or the like) may transmit a master information block message that identifies a frequency domain location parameter, a time domain location parameter, and/or the like.

At 1030, the base station may transmit the system information block type 1 (SIB1) message. For example, the base station (e.g., using controller/processor 240, transmit processor 220, TX MIMO processor 230, MOD 232, antenna 234, and/or the like) may transmit, using the non-anchor carrier or the anchor carrier, SIB1 message to a user equipment in accordance with a frequency domain location parameter, a time domain location parameter, and/or the like. In some aspects, the base station may generate the SIB1 message for NB-IoT communications with the user equipment. In some aspects, the SIB1 message may be another type of message, such as another type of system information block message, a non-system information block message, and/or the like.

Method 1000 may include additional aspects, such as any single aspect or any combination of aspects described below.

In some aspects, the SIB1 message is transmitted in a subframe 0 and a subframe 5 of alternating radio frames of the non-anchor carrier. In some aspects, the SIB1 message is transmitted in a subframe 0 of alternating radio frames of the anchor carrier. In some aspects, the frequency domain location parameter is associated with a physical resource block offset relative to a center frequency, and the anchor carrier is in a first frequency range greater than the center frequency by the physical resource block offset and the non-anchor carrier is in a second frequency range less than the center frequency by the physical resource block offset, or the non-anchor carrier is in the first frequency range greater than the center frequency by the physical resource block offset and the anchor carrier is in the second frequency range less than the center frequency by the physical resource block offset.

In some aspects, the non-anchor carrier is in at least one first physical resource block, of a resource block group, and the non-anchor carrier is in at least one second physical resource block, of the resource block group, that is contiguous to the at least one first physical resource block without one or more physical resource blocks, of the resource block group, between the at least one first physical resource block and the at least one second physical resource block. In some aspects, the non-anchor carrier and the anchor carrier are associated with a common guard band. In some aspects, the at least one second physical resource block is an inband physical resource block. In some aspects, the non-anchor carrier is in a first guardband and the anchor carrier is in a second guardband that is different than the first guardband.

In some aspects, a size or a value for the indicator at least one parameter, of the plurality of parameters, is identified based at least in part on a deployment mode, the deployment mode is at least one of: operation in one of an in-band deployment mode, a guard band deployment mode, or a stand-alone deployment mode. In some aspects, the frequency domain location parameter or the time domain location parameter is based at least in part on an offset indicator identifying a resource block offset with respect to the anchor carrier. In some aspects, the offset indicator is based at least in part on a resource block group, and the anchor carrier and the non-anchor carrier are in resource blocks of the resource block group. In some aspects, a frequency domain location for the non-anchor carrier is opposite a frequency domain location of the anchor carrier with respect to a center frequency.

In some aspects, at least one parameter, of the plurality of parameters, is identified based at least in part on a physical resource block index offset of an anchor carrier. In some aspects, at least one parameter, of the plurality of parameters, is identified based at least in part on a resource block group of an inband communication. In some aspects, at least one repetition of the SIB1 message is transmitted on an anchor carrier and at least one repetition of the SIB1 message is transmitted on the non-anchor carrier.

In some aspects, a power boosting parameter, of the plurality of parameters, for the non-anchor carrier is less than a power value for the anchor carrier. In some aspects, a quantity of repetitions of a transmission on the non-anchor carrier is greater than a quantity of repetitions of a transmission on the anchor carrier. In some aspects, a subframe or frame for the SIB1 message is determined based at least in part on a cell identifier or a repetition configuration.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
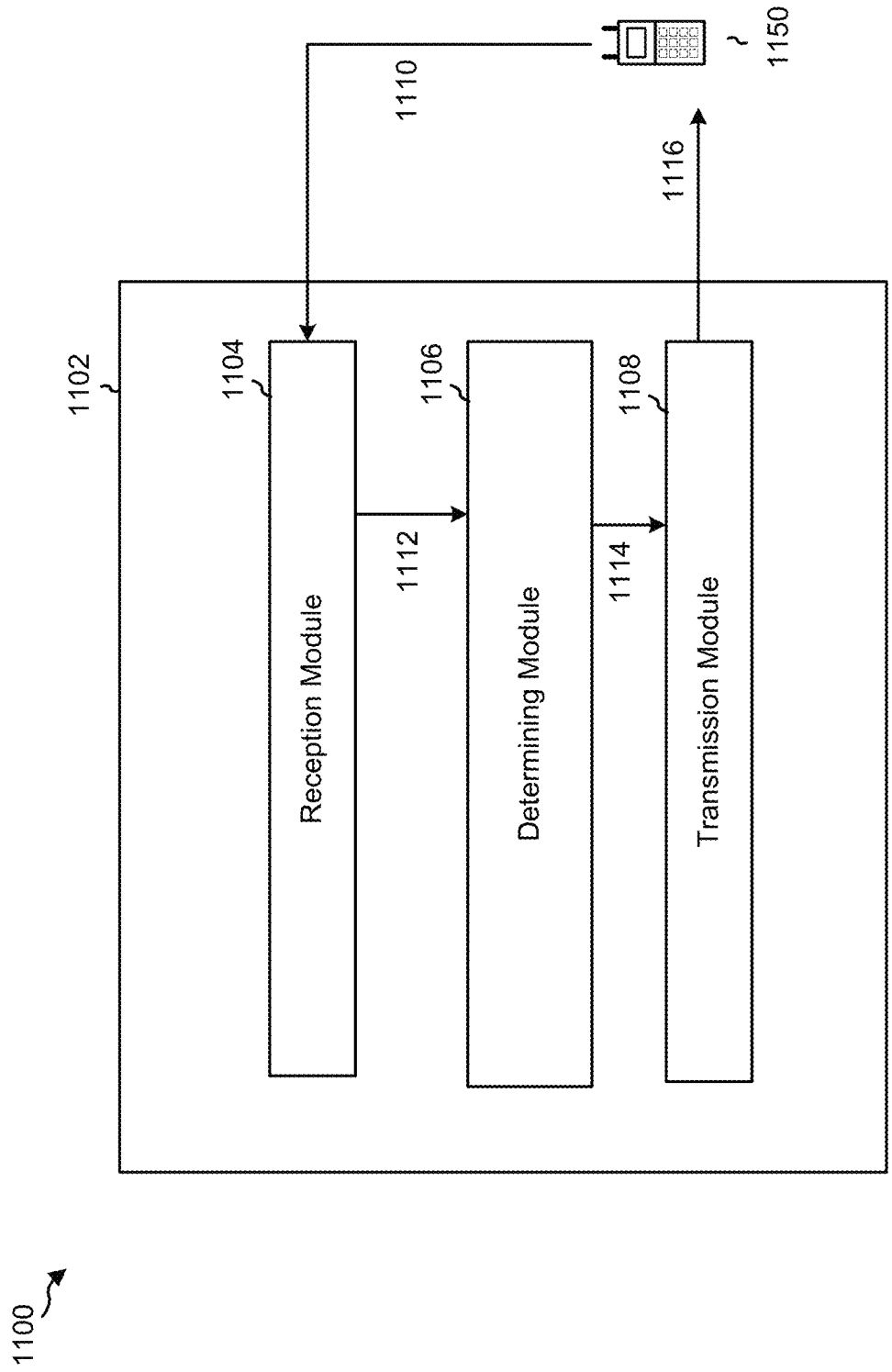
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a BS. In some aspects, the apparatus 1102 includes a reception module 1104, a determining module 1106, and/or a transmission module 1108.

The reception module 1104 may receive, from a user equipment 1150 and as data 1110 information associated with an NB-IoT communication. In some aspects, the reception module 1104 may receive a master information block message. For example, the reception module 1104 may receive a master information block message including a group of bits to signal an NB-IoT carrier frequency.

The determining module 1106 may receive, from the reception module 1104 and as data 1112 information associated with determining a plurality of parameters for an NB-IoT communication. In some aspects, the determining module 1106 may determine a plurality of parameters for a non-anchor carrier of a plurality of carriers. For example, the determining module 1106 may determine a frequency domain location parameter, a time domain location parameter, and/or the like for the non-anchor carrier. In some aspects, the determining module 1106 may determine the plurality of parameters based at least in part on information of a master information block message. For example, the determining module 1106 may determine a frequency location of the non-anchor carrier based at least in part on a group of bits included in a master information block message.

In some aspects, the determining module 1106 may determine a parameter, of the plurality of parameters, based at least in part on a deployment mode for NB-IoT. For example, for an in-band deployment mode, the determining module 1106 may determine that 5 bits of the master information block message indicate a physical resource block index offset value identifying an offset of the non-anchor carrier or an anchor carrier from a central frequency of a communications system. In this case, the offset of the non-anchor carrier may be an inverse of an offset of the anchor carrier. Additionally, or alternatively, for a guard band deployment or an in-band deployment, the master information block may include 2 bits associated with identifying a physical resource block index offset of a group of four configured physical resource block index offsets. In some aspects, the determining module 1106 may determine a parameter, of the plurality of parameters, based at least in part on a resource block group of an anchor carrier. For example, the determining module 1106 may determine a resource block group of the anchor carrier and may determine a frequency location and/or a time location of the non-anchor carrier, such that the non-anchor carrier is in the same resource block group.

In some aspects, the determining module 1106 may determine a power boosting parameter, of the plurality of parameters, for the non-anchor carrier. For example, the determining module 1106 may determine that the non-anchor carrier is to be associated with a lesser power value than for the anchor carrier. Additionally, or alternatively, the determining module 1106 may determine that the non-anchor carrier and the anchor carrier are to be associated with a common power value.

The transmission module 1108 may receive, from the determining module 1106 and as data 1114, information associated with transmitting data 1116 to the user equipment 1150. In some aspects, the transmission module 1108 may transmit a master information block message to identify a plurality of parameters associated with a system information block message (e.g., a time domain location parameter, a frequency domain location parameter, and/or the like). In some aspects, the transmission module 1108 may transmit repetitions of a system information block message to the user equipment 1150. For example, the transmission module 1108 may transmit multiple repetitions on an anchor carrier, on the non-anchor carrier, on a combination of the anchor carrier and the non-anchor carrier, and/or the like. In some aspects, the transmission module 1108 may transmit a particular quantity of repetitions of the system information block message. For example, when transmitting on the non-anchor carrier with a lesser power boosting value, the transmission module 1108 may transmit a greater quantity of repetitions on the non-anchor carrier relative to when transmitting on the anchor carrier with a greater power boosting value. In some aspects, the transmission module 1108 may transmit using a particular subset of resources, such as a particular subset of subframes or frames. For example, the transmission module 1108 may transmit using a particular subframe or frame based at least in part on a cell identifier for a cell, a repetition configuration (e.g., a quantity of configured repetitions), and/or the like.

The apparatus may include additional modules that perform each of the blocks of the algorithm in the aforementioned flow chart of FIG. 10. As such, each block in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
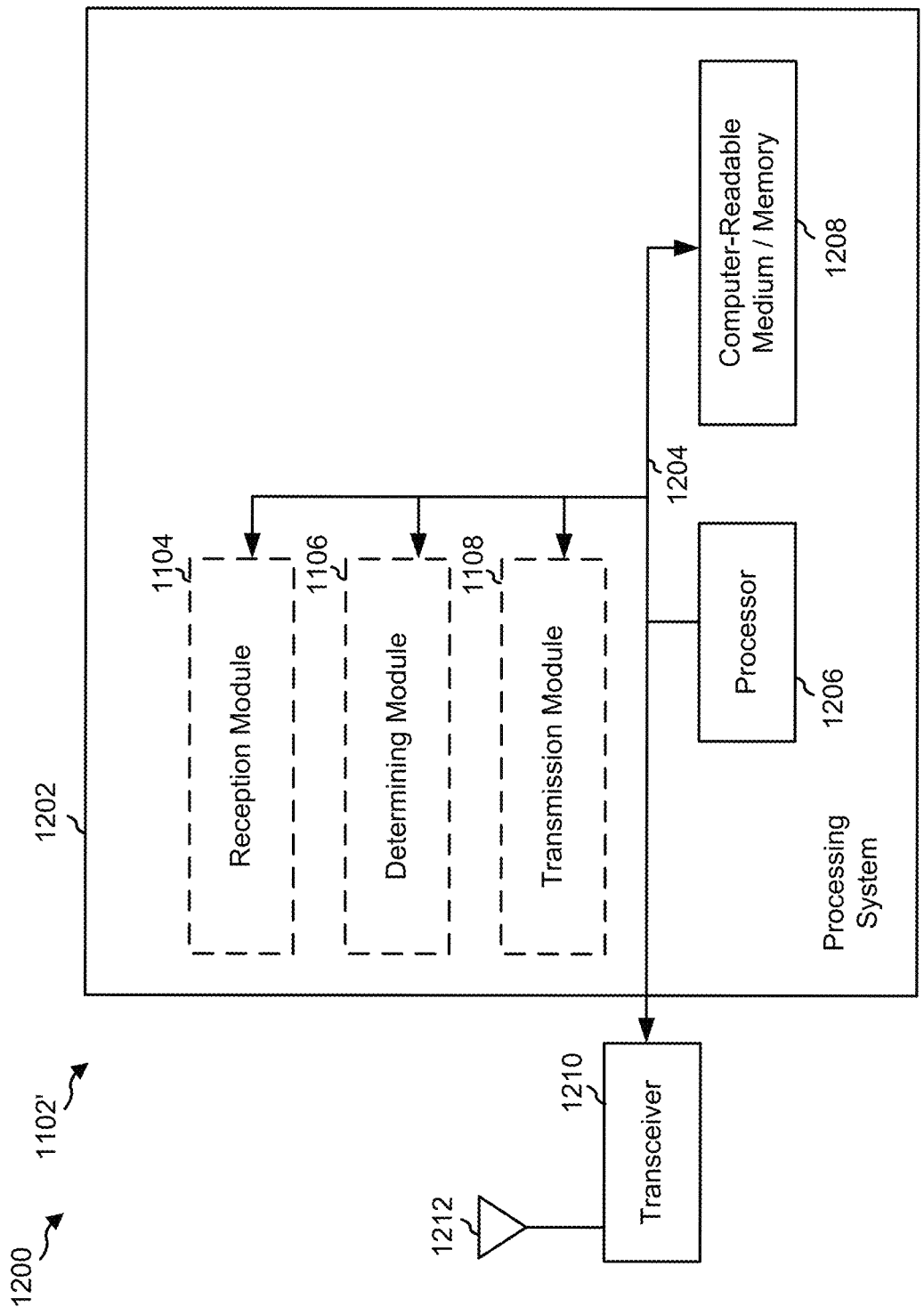
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a BS.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, 1108, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1108, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104, 1106, and 1108. The modules may be software modules running in the processor 1206, resident/stored in the computer readable medium/memory 1208, one or more hardware modules coupled to the processor 1206, or some combination thereof. The processing system 1202 may be a component of the BS 110 and may include the memory 242 and/or at least one of the TX MIMO processor 230, the RX processor 238, and/or the controller/processor 240.

In some aspects, the apparatus 1102/1102' for wireless communication includes means for transmitting a master information block message including an indicator identifying a frequency domain location parameter or a time domain location parameter for a non-anchor carrier or an anchor carrier, means for transmitting, using the non-anchor carrier or the anchor carrier, a system information block type 1 (SIB1) message to a user equipment in accordance with the frequency domain location parameter or the time domain location parameter, and/or the like. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 12 is provided as an example. Other examples are possible and may differ from what was described in connection with FIG. 12.

Figure 13:
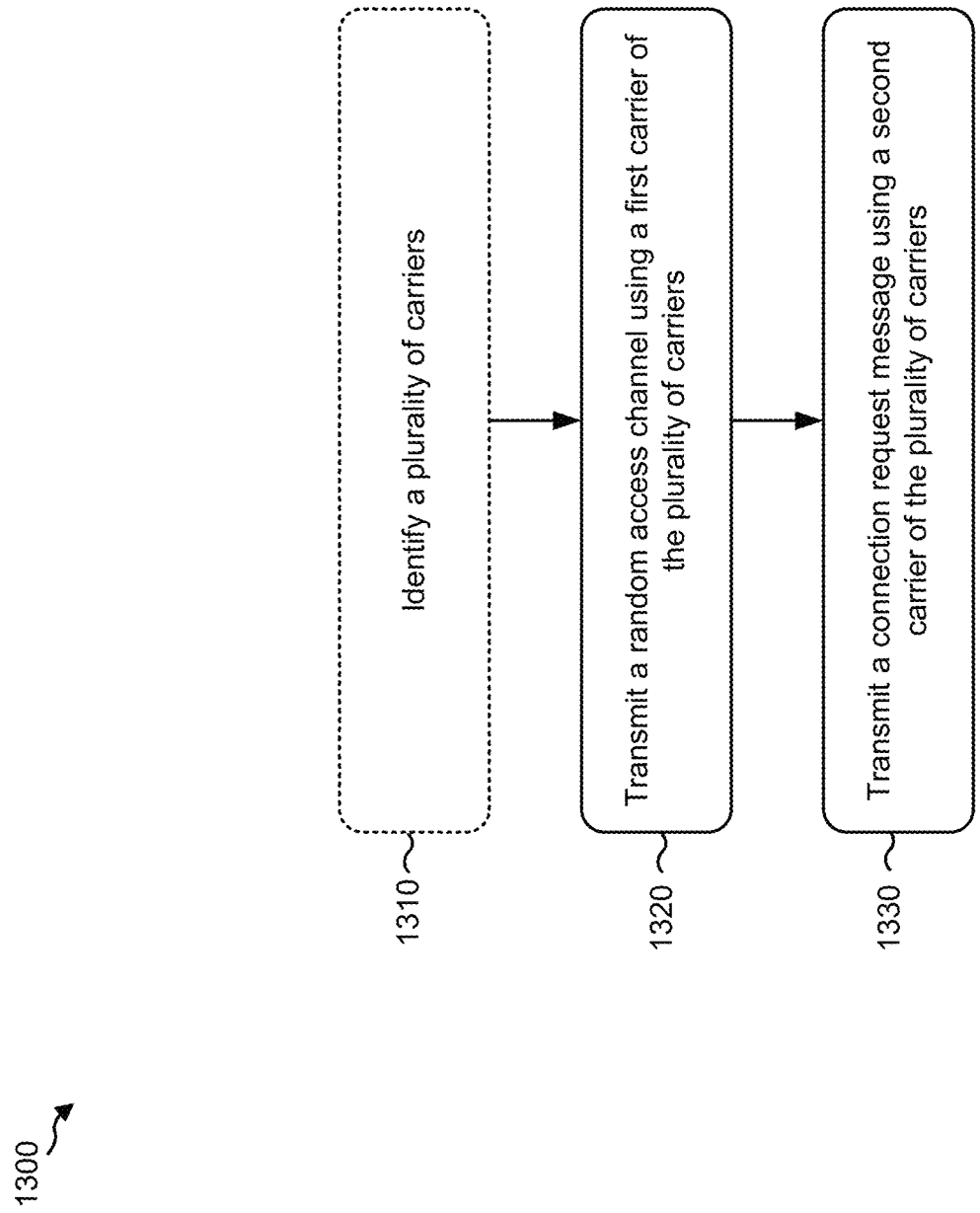
FIG. 13 is a flow chart of a method of wireless communication.

FIG. 13 is a flow chart of a method 1300 of wireless communication for transmitting a connection request message. The method may be performed by a user equipment (e.g., the UE 120, the UE 1150, the apparatus 1402/1402', and/or the like).

At 1310, in some aspects, the user equipment may identify a plurality of carriers. For example, the user equipment (e.g., using controller/processor 280 and/or the like) may identify a plurality of carriers in a time division duplex network for random access.

At 1320, the user equipment may transmit a random access channel using a first carrier of the plurality of carriers. For example, the user equipment (e.g., using controller/processor 280, transmit processor 264, TX MIMO processor 266, MOD 254, antenna 252, and/or the like) may transmit a random access channel preamble using a first carrier, of the plurality of carriers, based at least in part on identifying the plurality of carriers.

At 1330, the user equipment may transmit a connection request message using a second carrier of the plurality of carriers. For example, the user equipment (e.g., using controller/processor 280, transmit processor 264, TX MIMO processor 266, MOD 254, antenna 252, and/or the like) may transmit a connection request message using a second carrier, of the plurality of carriers, that is different from the first carrier.

Method 1300 may include additional aspects, such as any single aspect or any combination of aspects described below.

In some aspects, the plurality of carriers include at least one anchor carrier and at least one non-anchor carrier used for a random access channel message. In some aspects, the second carrier for the connection request message is based at least in part on a carrier selection indicator from a random access response message (msg2).

In some aspects, the second carrier for the connection request message is based at least in part on predetermined information or a received system information block message. In some aspects, the connection request message is transmitted using a next available subframe not overlapping with a random access channel resource. In some aspects, at least one of the plurality of carriers is based at least in part on a carrier selection indicator of a random access message.

In some aspects, the plurality of carriers includes another non-anchor carrier or an anchor carrier. In some aspects, the connection request message and the random access channel message are multiplexed in a common resource block. In some aspects, the second carrier for the connection request message is selected based at least in part on a quantity of random access channel subcarriers and a transmission bandwidth associated with the connection request message.

In some aspects, the connection request message and the random access channel message are transmitted using a common carrier of the plurality of carriers. In some aspects, the plurality of carriers are identified based at least in part on stored information or a received system information block message. In some aspects, the connection request message is transmitted using a next available subframe not overlapping with a random access channel resource.

Although FIG. 13 shows example blocks of a method of wireless communication, in some aspects, the method may include additional blocks, fewer blocks, different blocks, or differently arranged blocks than those shown in FIG. 13. Additionally, or alternatively, two or more blocks shown in FIG. 13 may be performed in parallel.

Figure 14:
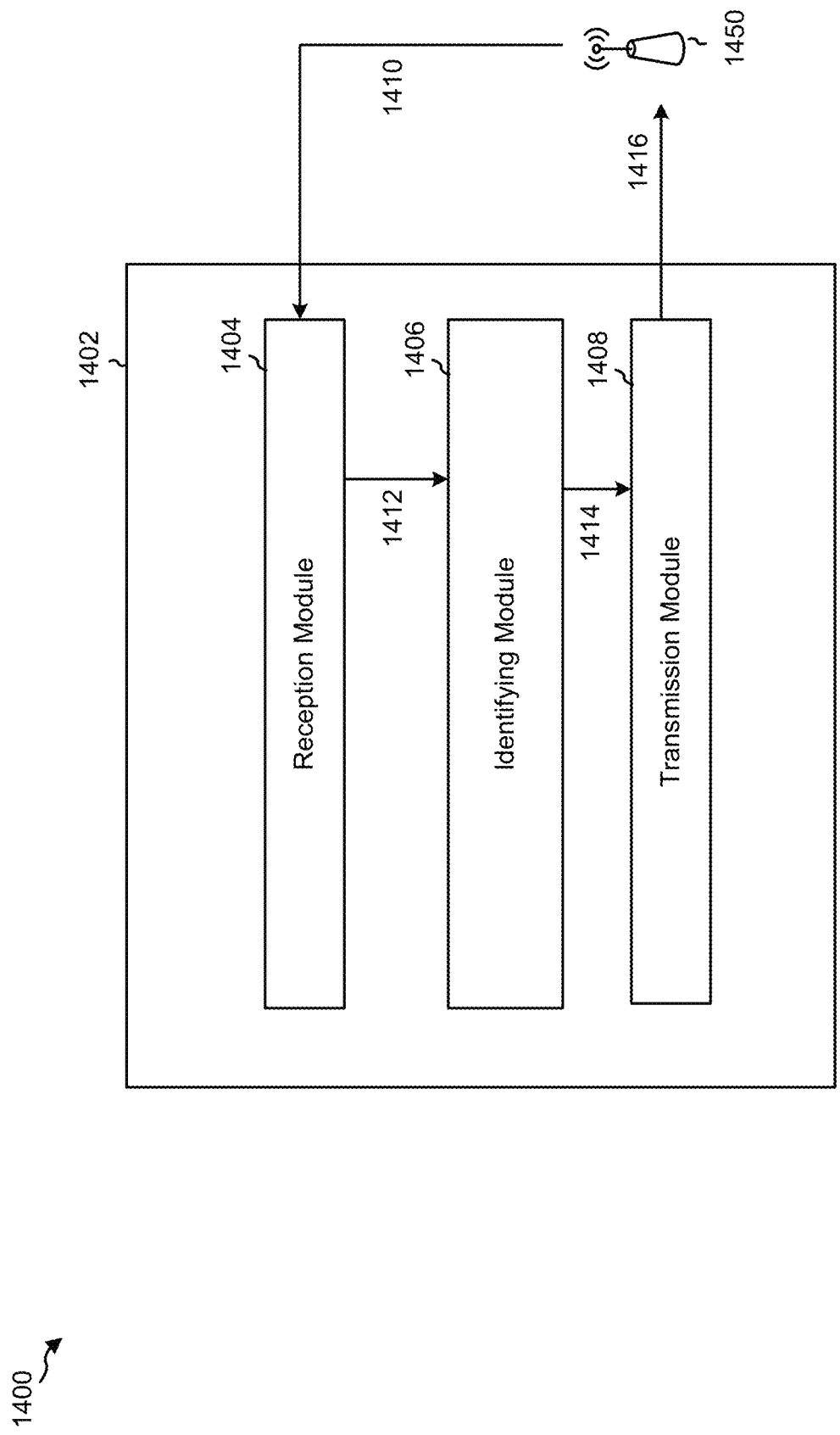
FIG. 14 is a conceptual data flow diagram illustrating the data flow between different modules/means/components in an example apparatus.

FIG. 14 is a conceptual data flow diagram 1400 illustrating the data flow between different modules/means/components in an example apparatus 1402. The apparatus 1402 may be a UE. In some aspects, the apparatus 1402 includes a reception module 1404, an identifying module 1406, and/or a transmission module 1408.

The reception module 1404 may receive, from a base station 1450 and as data 1410, information associated with identifying a plurality of carriers. In some aspects, the reception module 1404 may receive a carrier selection indicator. For example, the reception module 1404 may receive a random access request message with a bit indicator identifying a different carrier (e.g., different relative to a carrier for transmitting the NB-PRACH) for transmitting a connection request message (e.g., a Msg3 type message). Additionally, or alternatively, the reception module 1404 may receive a system information block message identifying the different carrier.

The identifying module 1406 may receive, from the reception module 1404 and as data 1412, information associated with identifying the plurality of carriers. Additionally, or alternatively, the identifying module 1406 may identify the plurality of carriers based at least in part on a stored configuration. In some aspects, the identifying module 1406 may identify the plurality of carriers in a time division duplex network. For example, the identifying module 1406 may identify a non-anchor carrier for a connection request message and an anchor carrier for an NB-PRACH message. In some aspects, the identifying module 1406 may identify a carrier for transmitting a connection request message based at least in part on a received carrier selection indicator.

In some aspects, the identifying module 1406 may identify a carrier for the connection request message based at least in part on a characteristic of the NB-PRACH. For example, based at least in part on the connection request message and the NB-PRACH being able to be multiplexed in a physical resource block, the identifying module 1406 may determine whether to cause the transmission module 1408 to transmit the connection request message and the NB-PRACH in different carriers or in a common carrier. In some aspects, the identifying module 1406 may determine whether to cause the transmission module 1408 to transmit the connection request message and the NB-PRACH in different carriers or in a common carrier based at least in part on a quantity of random access channel subcarriers, a transmission bandwidth associated with the connection request message, and/or the like.

The transmission module 1408 may receive, from the identifying module 1406, and as data 1414, information associated with transmitting a connection request message as data 1416 to the base station 1450. For example, the transmission module 1408 may transmit using at least one of the plurality of carriers, such as transmitting a connection request using the non-anchor carrier and an NB-PRACH using an anchor carrier. In some aspects, the transmission module 1408 may transmit the connection request message in a subframe not overlapping with a random access channel resource. For example, when the transmission module 1408 is to transmit an NB-PRACH using the random access channel resource and a resource for the connection request message collides with the random access channel resource, the transmission module 1408 may transmit the connection request message in a next available subframe. Additionally, or alternatively, the transmission module 1408 may transmit the connection request message using a different carrier than for the NB-PRACH. In some aspects, the transmission module 1408 may multiple the connection request message and the NB-PRACH into a common carrier.

The apparatus may include additional modules that perform each of the blocks of the algorithm in the aforementioned flow chart of FIG. 13. As such, each block in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 14 are provided as an example. In practice, there may be additional modules, fewer modules, different modules, or differently arranged modules than those shown in FIG. 14. Furthermore, two or more modules shown in FIG. 14 may be implemented within a single module, or a single module shown in FIG. 14 may be implemented as multiple, distributed modules. Additionally, or alternatively, a set of modules (e.g., one or more modules) shown in FIG. 14 may perform one or more functions described as being performed by another set of modules shown in FIG. 14.

Figure 15:
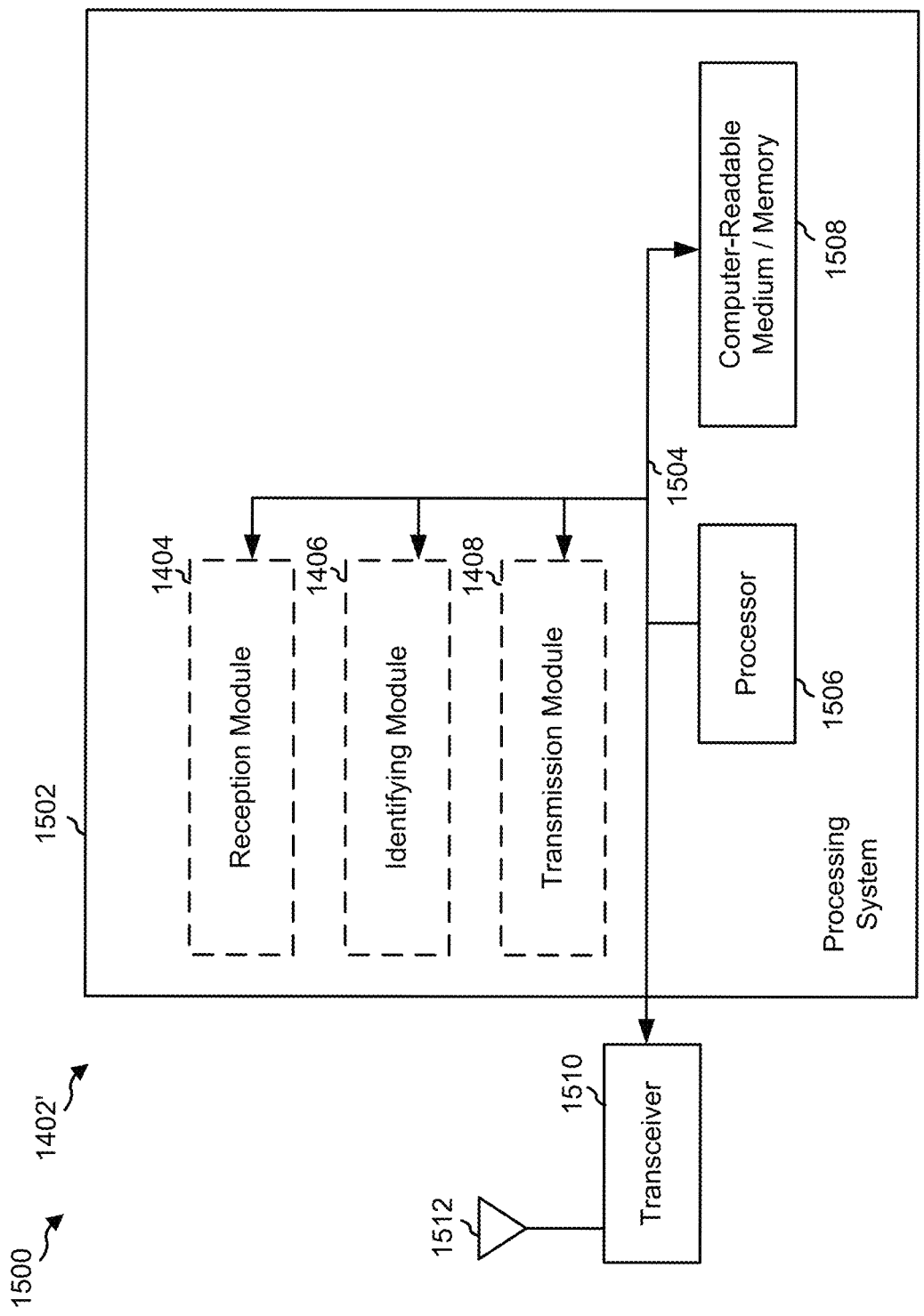
FIG. 15 is a diagram illustrating an example of a hardware implementation for an apparatus employing a processing system.

FIG. 15 is a diagram 1500 illustrating an example of a hardware implementation for an apparatus 1402' employing a processing system 1502. The apparatus 1402' may be a UE.

The processing system 1502 may be implemented with a bus architecture, represented generally by the bus 1504. The bus 1504 may include any number of interconnecting buses and bridges depending on the specific application of the processing system 1502 and the overall design constraints. The bus 1504 links together various circuits including one or more processors and/or hardware modules, represented by the processor 1506, the modules 1404, 1406, 1408, and the computer-readable medium/memory 1508. The bus 1504 may also link various other circuits such as timing sources, peripherals, voltage regulators, and power management circuits, which are well known in the art, and therefore, will not be described any further.

The processing system 1502 may be coupled to a transceiver 1510. The transceiver 1510 is coupled to one or more antennas 1512. The transceiver 1510 provides a means for communicating with various other apparatus over a transmission medium. The transceiver 1510 receives a signal from the one or more antennas 1512, extracts information from the received signal, and provides the extracted information to the processing system 1502, specifically the reception module 1404. In addition, the transceiver 1510 receives information from the processing system 1502, specifically the transmission module 1408, and based at least in part on the received information, generates a signal to be applied to the one or more antennas 1512. The processing system 1502 includes a processor 1506 coupled to a computer-readable medium/memory 1508. The processor 1506 is responsible for general processing, including the execution of software stored on the computer-readable medium/memory 1508. The software, when executed by the processor 1506, causes the processing system 1502 to perform the various functions described supra for any particular apparatus. The computer-readable medium/memory 1508 may also be used for storing data that is manipulated by the processor 1506 when executing software. The processing system further includes at least one of the modules 1404, 1406, and 1408. The modules may be software modules running in the processor 1506, resident/stored in the computer readable medium/memory 1508, one or more hardware modules coupled to the processor 1506, or some combination thereof. The processing system 1502 may be a component of the UE 120 and may include the memory 282 and/or at least one of the TX MIMO processor 266, the RX processor 258, and/or the controller/processor 280.

In some aspects, the apparatus 1402/1402' for wireless communication includes means for transmitting a random access channel using a first carrier, of the plurality of carriers, in a time division duplex network for random access, means for transmitting a connection request message using a second carrier, of the plurality of carriers, that is different from the first carrier, and/or the like. The aforementioned means may be one or more of the aforementioned modules of the apparatus 1402 and/or the processing system 1502 of the apparatus 1402' configured to perform the functions recited by the aforementioned means. As described supra, the processing system 1502 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 15 is provided as an example. Other examples are possible and may differ from what was described in connection with FIG. 15.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   transmitting, by a base station, a master information block message including an indicator identifying a frequency domain location parameter or a time domain location parameter for a non-anchor carrier or an anchor carrier; and
   transmitting, by the base station and using the non-anchor carrier or the anchor carrier, a system information block type 1 (SIB1) message to a user equipment in accordance with the frequency domain location parameter or the time domain location parameter,
   wherein the non-anchor carrier is in at least one first physical resource block of a resource block group, and
   wherein the non-anchor carrier is in at least one second physical resource block, of the resource block group, that is contiguous to the at least one first physical resource block without any other physical resource blocks of the resource block group between the at least one first physical resource block and the at least one second physical resource block.

2. The method of claim 1, wherein the SIB1 message is transmitted in a subframe 0 and a subframe 5 of alternating radio frames of the non-anchor carrier.

3. The method of claim 1, wherein the SIB1 message is transmitted in a subframe 0 of alternating radio frames of the anchor carrier.

4. The method of claim 1, wherein the non-anchor carrier and the anchor carrier are associated with a common guard band.

5. The method of claim 1, wherein the at least one second physical resource block is an inband physical resource block.

6. The method of claim 1, wherein the non-anchor carrier is in a first guardband and the anchor carrier is in a second guardband that is different than the first guardband.

7. The method of claim 1, wherein a size or a value for the indicator is based at least in part on a deployment mode, and wherein the deployment mode is at least one of:
   an in-band deployment mode,
   a guard band deployment mode, or
   a stand-alone deployment mode.

8. The method of claim 1, wherein the frequency domain location parameter or the time domain location parameter is based at least in part on an offset indicator identifying a resource block offset with respect to the anchor carrier.

9. The method of claim 1, a frequency domain location for the non-anchor carrier is opposite a frequency domain location of the anchor carrier with respect to a center frequency.

10. The method of claim 1, wherein a subframe or frame for the SIB1 message is determined based at least in part on a cell identifier or a repetition configuration.

11. A method of wireless communication, comprising:
    transmitting, by a base station, a master information block message including an indicator identifying a frequency domain location parameter or a time domain location parameter for a non-anchor carrier or an anchor carrier; and
    transmitting, by the base station and using the non-anchor carrier or the anchor carrier, a system information block type 1 (SIB1) message to a user equipment in accordance with the frequency domain location parameter or the time domain location parameter,
    wherein the frequency domain location parameter or the time domain location parameter is based at least in part on an offset indicator identifying a resource block offset with respect to the anchor carrier,
    wherein the offset indicator is based at least in part on a resource block group, and
    wherein the anchor carrier and the non-anchor carrier are in resource blocks of the resource block group.

12. A base station for wireless communication, comprising: a memory; and one or more processors coupled to the memory and configured to cause the base station to:
    transmit a master information block message including an indicator identifying a frequency domain location parameter or a time domain location parameter for a non-anchor carrier or an anchor carrier; and
    transmit, using the non-anchor carrier or the anchor carrier, a system information block type 1 (SIB1) message to a user equipment in accordance with the frequency domain location parameter or the time domain location parameter,
    wherein the non-anchor carrier is in at least one first physical resource block, of a resource block group, and
    wherein the non-anchor carrier is in at least one second physical resource block, of the resource block group, that is contiguous to the at least one first physical resource block without any other physical resource blocks of the resource block group between the at least one first physical resource block and the at least one second physical resource block.

13. The base station of claim 12, wherein the one or more processors are configured to cause the base station to transmit the SIB1 message in a subframe 0 and a subframe 5 of alternating radio frames of the non-anchor carrier.

14. The base station of claim 12, wherein the one or more processors are configured to cause the base station to transmit the SIB1 message in a subframe 0 of alternating radio frames of the anchor carrier.

15. The base station of claim 12, wherein the non-anchor carrier is in a first guardband and the anchor carrier is in a second guardband that is different than the first guardband.

16. The base station of claim 12, wherein a size or a value for the indicator is based at least in part on a deployment mode, and wherein the deployment mode is at least one of:
   an in-band deployment mode,
   a guard band deployment mode, or
   a stand-alone deployment mode.

17. The base station of claim 12, a frequency domain location for the non-anchor carrier is opposite a frequency domain location of the anchor carrier with respect to a center frequency.

18. The base station of claim 12, wherein the one or more processors are configured to cause the base station to determine a subframe or frame for the SIB1 message based at least in part on a cell identifier or a repetition configuration.

19. The base station of claim 12, wherein the non-anchor carrier and the anchor carrier are associated with a common guard band, or wherein the at least one second physical resource block is an inband physical resource block.

20. A base station for wireless communication, comprising: a memory; and one or more processors coupled to the memory and configured to cause the base station to:
   transmit a master information block message including an indicator identifying a frequency domain location parameter or a time domain location parameter for a non-anchor carrier or an anchor carrier; and
   transmit, using the non-anchor carrier or the anchor carrier, a system information block type 1 (SIB1) message to a user equipment in accordance with the frequency domain location parameter or the time domain location parameter,
   wherein the frequency domain location parameter or the time domain location parameter is based at least in part on an offset indicator identifying a resource block offset with respect to the anchor carrier,
   wherein the offset indicator is based at least in part on a resource block group, and
   wherein the anchor carrier and the non-anchor carrier are in resource blocks of the resource block group.

\* \* \* \* \*